United States Patent
Yu

(10) Patent No.: US 9,179,500 B2
(45) Date of Patent: Nov. 3, 2015

(54) RADIO BASE STATION AND METHOD FOR TRANSMITTING COMMON PUBLIC RADIO INTERFACE DATA IN RADIO BASE STATION

(75) Inventor: Weidong Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 13/539,146

(22) Filed: Jun. 29, 2012

(65) Prior Publication Data
US 2013/0003677 A1 Jan. 3, 2013

Related U.S. Application Data

(63) Continuation of application No. PCT/CN2010/080475, filed on Dec. 30, 2010.

(30) Foreign Application Priority Data

Dec. 31, 2009 (CN) .......................... 2009 1 0216924

(51) Int. Cl.
*H04W 72/04* (2009.01)
*H04W 88/08* (2009.01)
*H04L 25/14* (2006.01)
*H04W 24/04* (2009.01)
*H04W 92/12* (2009.01)

(52) U.S. Cl.
CPC ............. *H04W 88/085* (2013.01); *H04L 25/14* (2013.01); *H04W 24/04* (2013.01); *H04W 92/12* (2013.01)

(58) Field of Classification Search
CPC ..... H04W 72/04; H04W 88/08; H04W 76/00; H04L 5/14; H04L 5/1423
USPC .......................................... 370/329, 276, 229
See application file for complete search history.

(56) References Cited

U.S. PATENT DOCUMENTS 7,656,897 B2   2/2010 Liu
7,680,149 B2   3/2010 Liu et al.
(Continued)

FOREIGN PATENT DOCUMENTS

CN   1859661 A   11/2006
CN   1956564 A   5/2007
(Continued)

OTHER PUBLICATIONS

International Search Report received in Patent Cooperation Treaty Application No. PCT/CN2010/080475, mailed Mar. 31, 2011, 4 pages.

(Continued)

*Primary Examiner* — Andrew Lai
*Assistant Examiner* — Zhiren Qin
(74) *Attorney, Agent, or Firm* — Slater & Matsil, L.L.P.

(57) ABSTRACT

A method for transmitting Common Public Radio Interface (CPRI) data in a radio base station is provided, which is applicable to the radio base station having at least two CPRI links between a Radio Equipment Control (REC) and a Radio Equipment (RE). The method includes: dividing by the REC, in-phase/quadrature phase (I/Q) data that needs to be transmitted to the RE into multiple paths of I/Q data with different content, where the multiple paths of I/Q data with different content make up the I/Q data before being divided; transmitting, by the REC, all paths of divided I/Q data to the RE over the at least two CPRI links.

17 Claims, 32 Drawing Sheets

(56) References Cited

U.S. PATENT DOCUMENTS

2008/0273493 A1* 11/2008 Fong .............................. 370/330
2009/0252108 A1* 10/2009 Watanabe ..................... 370/329
2010/0016013 A1* 1/2010 Kabashima et al. ....... 455/552.1

FOREIGN PATENT DOCUMENTS

| CN | 1960231 A | 5/2007 |
|---|---|---|
| CN | 101009934 A | 8/2007 |
| CN | 101174981 A | 5/2008 |
| CN | 101242593 A | 8/2008 |
| CN | 101309465 A | 11/2008 |
| CN | 101584247 A | 11/2009 |
| EP | 1 827 035 A1 | 8/2007 |
| EP | 2 131 602 A1 | 12/2009 |
| WO | WO 2005/034544 A1 | 4/2005 |
| WO | WO 2005/048625 A1 | 5/2005 |

OTHER PUBLICATIONS

Written Opinion of the International Searching Authority received in Patent Cooperation Treaty Application No. PCT/CN2010/080475, mailed Mar. 31, 2011, 4 pages.

First Chinese Office Action received in Chinese Application No. 200910216924.4, mailed Oct. 30, 2012, 17 pages. (Partial Translation).

"Common Public Radio Interface (CPRI); Interface Specification," CPRI Specification V4.1, Feb. 18, 2009, 110 pages.

Extended European Search Report received in Application No. 10840585.3-1505 mailed Feb. 22, 2013, 9 pages.

\* cited by examiner

RADIO BASE STATION AND METHOD FOR TRANSMITTING COMMON PUBLIC RADIO INTERFACE DATA IN RADIO BASE STATION

CROSS-REFERENCE TO RELATED APPLICATIONS

This application is a continuation of International Application No. PCT/CN2010/080475, filed on Dec. 30, 2010, which claims priority to Chinese Patent Application No. 200910216924.4, filed on Dec. 31, 2009, both of which are hereby incorporated by reference in their entireties.

FIELD OF THE INVENTION

The present invention relates to radio communication technologies, and in particular, to a radio base station and a method for transmitting Common Public Radio Interface (CPRI) data in a radio BS.

BACKGROUND OF THE INVENTION

Currently, Base Band Unit (BBU) and Remote Radio Unit (RRU) are employed in some radio base stations. Both the BBU and the RRU comply with the CPRI protocol. The BBU corresponds to a Radio Equipment Control (REC) in the CPRI protocol, and the RRU corresponds to Radio Equipment (RE) in the CPRI protocol. Depending on the application scenario, multiple REs may form a chain, a star, or a ring. An interface between the REC and the RE is known as a CPRI, and a link between the REC and the RE is known as a CPRI link.

If the CPRI link backup mode is applied, two CPRI links exist between the REC and the RE. One CPRI link is set between one port of the REC and one port of the RE, and the other CPRI link is set between the other port of the REC and the other port of the RE. According to the existing CPRI data transmission scheme, one CPRI link is used to transmit user-plane data and control-plane data, and the other CPRI link is used to detect signals to judge whether the link is connected or not.

In the prior art, if the amount of user-plane data is large and is transmitted by only one CPRI link, the CPRI link for transmitting user-plane data may be congested, and even the data may be lost.

SUMMARY OF THE INVENTION

The embodiments of the present invention provide a radio base station, a method for transmitting CPRI data in a radio base station, and a method for processing CPRI data in a radio base station.

In an aspect, an embodiment of the present invention provides a method for transmitting CPRI data in a radio base station, which is applicable to a radio base station with at least two CPRI links between an REC and an RE. The method includes: dividing, by the REC, in-phase/quadrature phase (I/Q) data that needs to be transmitted to the RE in a divided manner into multiple paths of I/Q data with different content; and transmitting, by the REC, all paths of divided I/Q data to the RE over the at least two CPRI links, where each path of divided I/Q data is transmitted over a different CPRI link.

In another aspect, an embodiment of the present invention provides a method for processing CPRI data in a radio base station, which is applicable to a radio base station with at least two CPRI links between an REC and an RE. The method includes: receiving, by the RE, multiple paths of I/Q data with different content transmitted by the same REC over the at least two CPRI links, where the multiple paths of I/Q data with different content make up I/Q data that needs to be transmitted by the REC to the RE in a divided manner; and combining, by the RE, the multiple paths of I/Q data with different content into the I/Q data that needs to be transmitted by the REC to the RE in a divided manner.

In another aspect, an embodiment of the present invention provides a method for transmitting CPRI data in a radio base station, which is applicable to a radio base station with at least two CPRI links between an REC and an RE. The method includes: dividing, by the RE, I/Q data that needs to be transmitted to the REC in a divined manner into multiple paths of I/Q data with different content; and transmitting, by the RE, all paths of divided I/Q data to the REC over the at least two CPRI links, where each path of divided I/Q data is transmitted over a different CPRI link.

In another aspect, an embodiment of the present invention provides a method for processing CPRI data in a radio base station, which is applicable to a radio base station with at least two CPRI links between an REC and an RE. The method includes: receiving, by the REC, multiple paths of I/Q data with different content transmitted by the RE over the at least two CPRI links, where the multiple paths of I/Q data with different content make up I/Q data that needs to be transmitted by the RE to the REC in a divided manner; and combining the multiple paths of I/Q data into the I/Q data that needs to be transmitted by the RE to the REC in a divided manner.

In another aspect, an embodiment of the present invention provides a radio base station, where the radio base station includes an REC and an RE. At least two CPRI links exist between the REC and the RE, and I/Q data between the REC and the RE is transmitted over the at least two CPRI links.

In the embodiments of the present invention, the user-plane data exchanged between the RE and the REC is transmitted over all CPRI links between the RE and the REC. That is, all CPRI links between the RE and the REC can be used to transmit the user-plane data between the RE and the REC, thereby avoiding congestion of the CPRI link when the amount of user-plane data is large.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention. Persons of ordinary skill in the art can derive other drawings from the accompanying drawings without any creative effort.

DETAILED DESCRIPTION OF THE EMBODIMENTS

The technical solutions of the present invention will be clearly and completely described in the following with reference to the accompanying drawings. It is obvious that the embodiments to be described are only apart rather than all the embodiments of the present invention. All other embodiments obtained by persons of ordinary skill in the art based on the embodiments of the present invention without any creative effort shall fall within the protection scope of the present invention.

To make persons of ordinary skill in the art understand the present invention better, professional knowledge involved in the embodiments of the present invention is introduced first.

Base stations are classified into single-mode base stations and multi-mode base stations.

Figure 1:
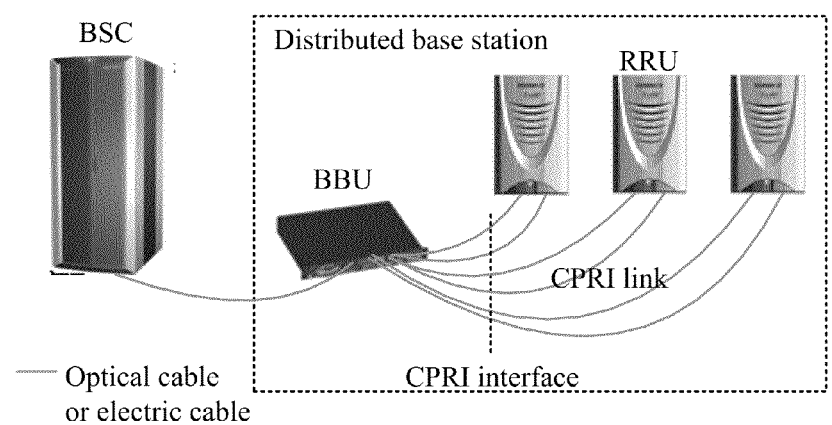
FIG. 1 is a schematic diagram illustrating a logical structure of a single-mode base station according to an embodiment of the present invention.

As shown in FIG. 1, a single-mode base station includes an RRU and a BBU which bears an REC that supports a single mode.

Figure 2:
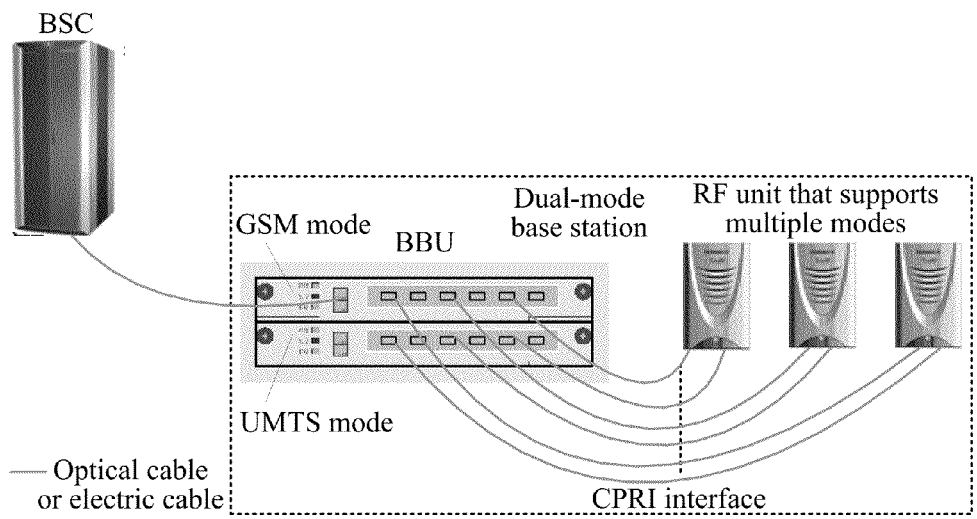
FIG. 2 is a schematic diagram illustrating a logical structure of a multi-mode base station according to an embodiment of the present invention.
Figure 2A:
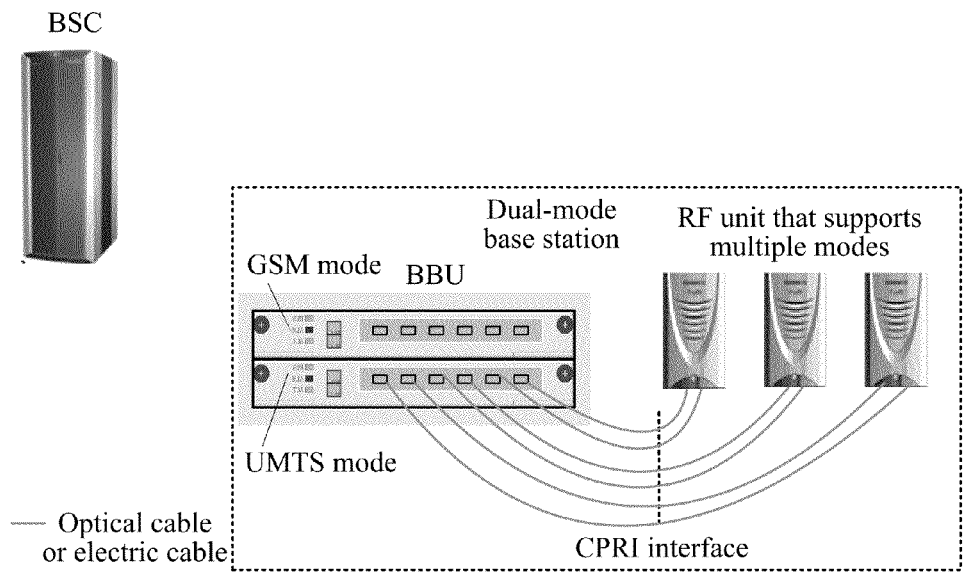
FIG. 2A is a schematic diagram illustrating a logical structure of a multi-mode base station according to an embodiment of the present invention.
Figure 3:
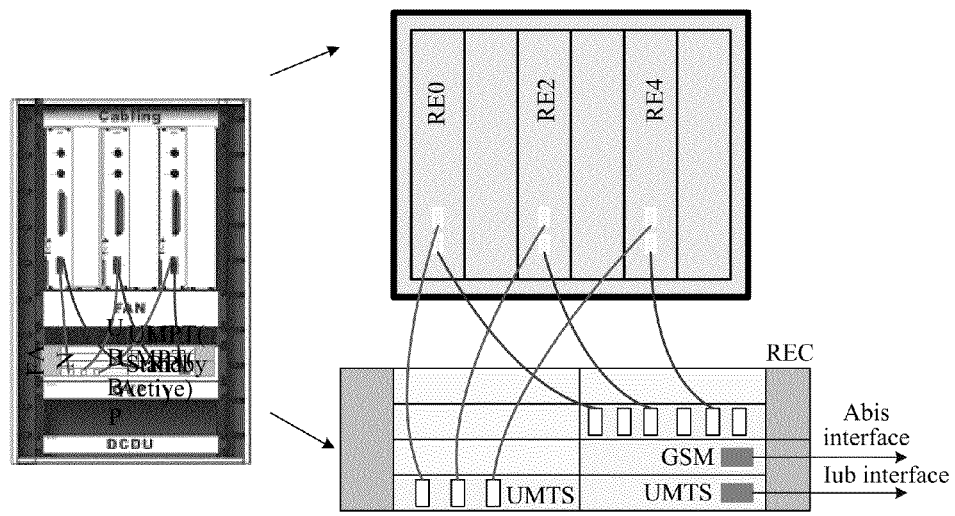
FIG. 3 is a schematic diagram illustrating a logical structure of a stackable dual-mode macro base station according to an embodiment of the present invention.

Several compositions of multi-mode base stations are shown in FIG. 2, FIG. 2A, and FIG. 3. A multi-mode base station may also include an RRU and a BBU which bears an REC that supports multiple modes. As shown in FIG. 2, FIG. 2A, and FIG. 3, the BBU bears an REC that supports two modes. For example, the two modes are Global System for Mobile Communications (GSM) and Universal Mobile Telecommunications System (UMTS).

As mentioned above, in the embodiments of the present invention, an interface between the REC and the RE is referred to as a CPRI. The CPRI is formulated by the CPRI Cooperation. Currently, the CPRI is widely applied to base stations of the 3nd Generation (3G) Mobile Communication Systems.

Figure 4:
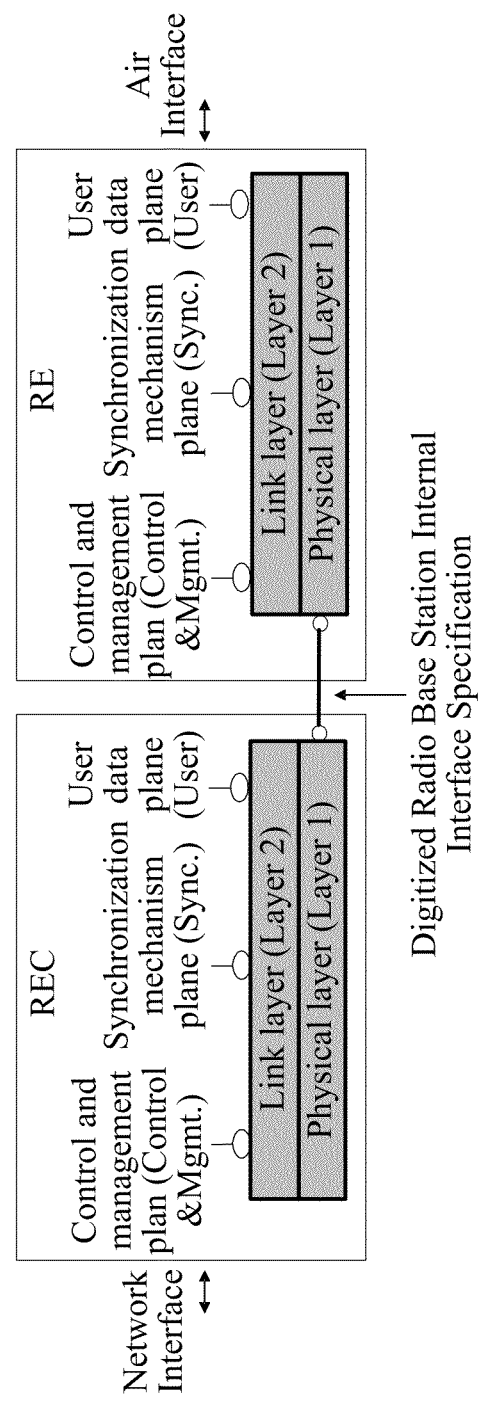
FIG. 4 is a schematic diagram illustrating three planes and three layers defined in a CPRI protocol according to an embodiment of the present invention.

The CPRI protocol includes three planes, that is, a user data plane, a control plane, and a synchronization mechanism plane. According to the protocol hierarchy, the CPRI protocol is divided into three layers, that is, a physical layer (Layer 1, L1), a link layer (Layer 2, L2), and an application layer (Layer 3, L3), and reference can be made to FIG. 4 for details. The CPRI protocol attaches importance to hardware-related protocol layers (L1 and L2), and ensures that independent technical evolution can be achieved through only limited adaptation of hardware. The CPRI protocol does not stipulate the application layer.

On the physical layer, 256 control words of each hyperframe are organized into 64 subchannels in a certain format, and each subchannel includes four control words. The control words form subchannels in the form of a matrix.

According to the definition of the CPRI protocol, the contents transmitted on the 64 subchannels are shown in Table 1.

TABLE 1

| subchannel number Ns | purpose of subchannel | Xs = 0 | Xs = 1 | Xs = 2 | Xs = 3 |
|---|---|---|---|---|---|
| 0 | sync&timing | sync byte K28.5 | HFN | BFN-low | BFN-high |
| 1 | slow C&M | slow C&M | slow C&M | slow C&M | slow C&M |
| 2 | L1 inband prot. | version | startup | L1-reset-LOS . . . | pointer p |
| 3 | reserved | reserved | reserved | reserved | reserved |
| . . . | . . . | . . . | . . . | . . . | . . . |
| 15 | reserved | reserved | reserved | reserved | reserved |
| 16 | vendor specific | vendor specific | vendor specific | vendor specific | vendor specific |
| . . . | . . . | . . . | . . . | . . . | . . . |
| p − 1 | vendor specific | vendor specific | vendor specific | vendor specific | vendor specific |
| pointer: p | fast C&M | fast C&M | fast C&M | fast C&M | fast C&M |
| . . . | . . . | . . . | . . . | . . . | . . . |
| 63 | fast C&M | fast C&M | fast C&M | fast C&M | fast C&M |

The vendor specific subchannels (subchannel 16-subchannel p-1) may be customized according to the product requirements.

To make the REC know topology structure information (including head location and tail location of the CPRI link, and RE location information) of each CPRI link, the REC and the RE need to implement operations such as I/Q data transmission, topology scan (YOP scan), and data configuration in cooperation. Therefore, the embodiments of the present invention define vendor-specific subchannel 16 in the CPRI protocol, as shown in Table 2.

TABLE 2

| subchannel number Ns | purpose of subchannel | Xs = 0 | Xs = 1 | Xs = 2 | Xs = 3 |
|---|---|---|---|---|---|
| 0 | sync&timing | sync byte K28.5 | HFN | BFN-low | BFN-high |
| 1 | slow C&M | slow C&M | slow C&M | slow C&M | slow C&M |
| 2 | L1 inband prot. | version | startup | L1-reset-LOS . . . | pointer p |
| 3 | reserved | reserved | reserved | reserved | reserved |
| . . . | . . . | . . . | . . . | . . . | . . . |
| 15 | reserved | reserved | reserved | reserved | reserved |
| 16 | vendor specific | Port ID/Slot ID | vendor specific | Hop Number | M&S Attribute |
| . . . | . . . | . . . | . . . | . . . | . . . |
| p − 1 | vendor specific | reserved of vs | reserved of vs | reserved of vs | reserved of vs |
| Pointer-p | faster C&M | faster C&M | faster C&M | faster C&M | faster C&M |
| . . . | . . . | . . . | . . . | . . . | . . . |
| 63 | faster C&M | faster C&M | faster C&M | faster C&M | faster C&M |

In Table 2, Port ID represents the port number of the CPRI link, and occupies #Z.16.0 byte. Specifically, the lower 4 bits of Z.16.0 are used for transmitting the Port ID in the REC. The 4 bits corresponding to "Port ID" can represent 16 port numbers.

The Port ID in the vendor-specific area is defined in Table 3.

TABLE 3

|  | Other purpose | | | Port ID |
|---|---|---|---|---|
| #Z.16.0 | b7(MSB) | B6 | b5 b4 | b3-b0(LSB) |

"Slot ID" represents the slot number of the CPRI link, and occupies #Z.16.1 byte. Specifically, the bits from the Most Significant Bit (MSB) to the Least Significant Bit (LSB) correspond to b7-b0 of Z.16.1 respectively. The "Slot ID" field is input by the REC, and forwarded by the RE in the CPRI link.

The Slot ID in the vendor-specific area is defined in Table 4.

TABLE 4

|  | Slot ID | | | |
|---|---|---|---|---|
| #Z.16.1 | b7(MSB) | B6 | b5 b4 | b3-b0(LSB) |

"M or S Attribute" refers the master or slave attribute of the port, and occupies #Z.208.0 byte. From the perspective of downlink, the transmission port is a master device, and the receiving port is a slave device. This field occupies the corresponding control word of each hyperframe.

The "M or S Attribute" in the vendor-specific area is defined in Table 5.

TABLE 5

|  | M or S Attribute | | |
|---|---|---|---|
| #Z.208.0 | b7(MSB) | b5-b1 | b0(LSB) |
|  | Reserved | | 1 represents master<br>0 represents slave |

"Hop Number" means that the RE adds 1 to the Hop Number on the Slave port in the downlink direction, and then forwards the Hop Number on the Master port; as for a bottom-level node in the uplink direction, the RE sends its Hop Number on the Slave port; as for a non-bottom-level node, the RE receives the Hop Number at the Master port, and forwards the Hop Number at the salve port directly.

Figure 5:
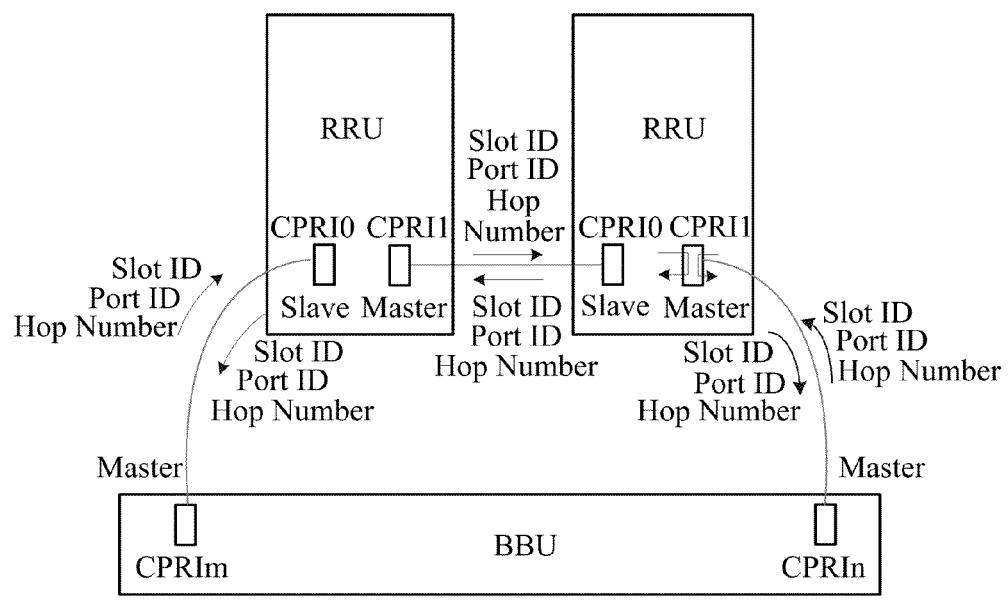
FIG. 5 is a schematic diagram illustrating a process of transmitting port ID, Slot ID, and Hop Number according to an embodiment of the present invention.

FIG. 5 shows a process of transmitting the Port ID, the Slot ID, and the Hop Number. The detailed transmission process is: (1) CPRIm of the BBU sends the Port ID and the Slot ID of CPRIm, and sends a Hop Number whose value is 0, in which the Hop Number 0 is the serial number of the left-side RRU shown in FIG. 5; the RRU corresponding to Hop Number 0 sends the Port ID and the Slot ID of CPRIm to the right-side RRU shown in FIG. 5, and sends a Hop Number whose value is 1, in which the Hop Number 1 is the serial number of the right-side RRU shown in FIG. 5; the RRU corresponding to Hop Number 1 sends the Port ID and the Slot ID of CPRIm of the BBU to CPRIn of the BBU, and sends a Hop Number whose value is invalid to CPRIn as regards Hop Number 0 sent from CPRIn; (2) CPRIn of the BBU sends the Port ID and the Slot ID of CPRIn, and sends a Hop Number whose value is 0; the RRU (right-side RRU shown in FIG. 5) corresponding to Hop Number 1 sends the Port ID and the Slot ID of CPRIn to the RRU (left-side RRU shown in FIG. 5) corresponding to Hop Number 0, and sends a Hop Number whose value is 1 to the RRU corresponding to Hop Number 0; the RRU corresponding to Hop Number 0 sends Port ID and Slot ID of CPRIn to CPRIm of the BBU, and sends a Hop Number whose value is 1. It should be noted that the foregoing process of transmitting the control words may be synchronous to the process of transmitting I/Q data.

Figure 6:
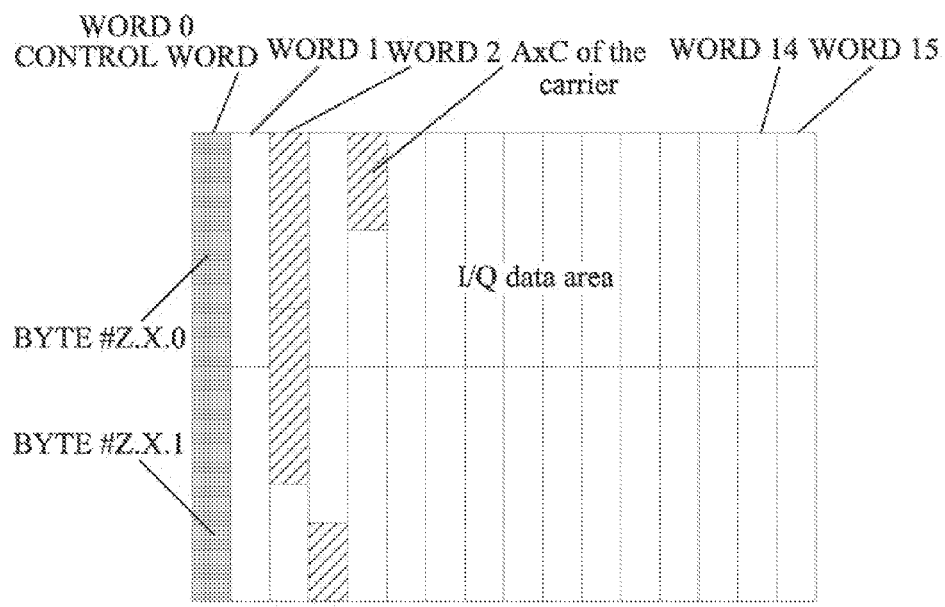
FIG. 6 is a schematic diagram illustrating a transmission format of I/Q data under a single-mode REC according to an embodiment of the present invention.

The user plane of the CPRI link transmits I/Q data. The I/Q data of different carriers are assigned to antenna-carrier (A×C) channels of the corresponding granularity (number of occupied bits). The A×C channels are called A×C containers in the CPRI protocol, and can share CPRI resources dynamically in the CPRI link through software control. FIG. 6 shows a transmission format of I/Q data under a single-mode REC.

In addition, in the embodiments of the present invention, user-plane data refers to I/Q data.

Further, all embodiments of the present invention are applicable to the radio base station with at least two CPRI links between the REC and the RE.

Figure 7:
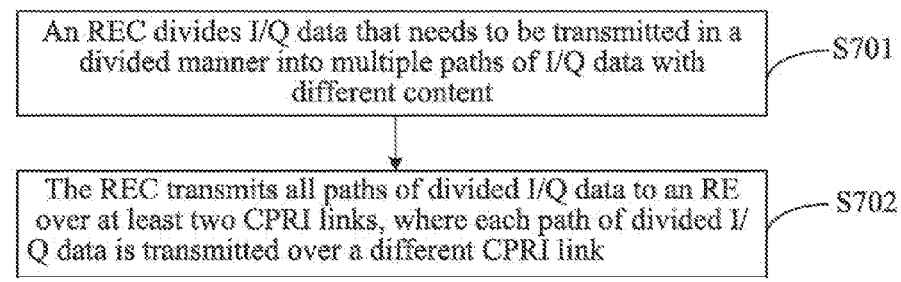
FIG. 7 is a flowchart of a method for transmitting CPRI data in a radio base station according to an embodiment of the present invention.

A method for transmitting CPRI data in a radio base station according to an embodiment of the present invention is described below. As shown in FIG. 7, the method includes the following steps.

S701: An REC divides I/Q data that needs to be transmitted to an RE in a divided manner into multiple paths of I/Q data with different content.

S702: The REC transmits all paths of divided I/Q data to an RE over at least two CPRI links, where each path of divided I/Q data is transmitted over a different CPRI link.

In S701, the REC divides the I/Q data that needs to be transmitted to the RE in a divided manner into multiple paths of I/Q data with different content, that is, the REC divides the I/Q data that needs to be transmitted to the RE and then transmits the divided data to the RE. Generally, the number of paths of the I/Q data divided by the REC is the same as the number of CPRI links.

In step S702, the REC transmits the divided I/Q data over every CPRI link. Generally, the REC transmits one path of divided I/Q data over each CPRI link, and the I/Q data transmitted by the same REC over each CPRI link has different content.

In practice, the REC may be an REC that supports a single mode. Two CPRI links exist between two ports of the REC that supports a single mode and two ports of the RE.

In this connection mode, the REC that supports a single mode divides the I/Q data that needs to be transmitted to the RE in a divided manner into two paths of I/Q data with different content. The REC transmits one path of divided I/Q data to the RE over one CPRI link, and transmits the other path of divided I/Q data to the RE over the other CPRI link. That is, the two CPRI links between the REC that supports a single mode and the RE can be simultaneously used to transmit the I/Q data that needs to be transmitted to the RE by the REC that supports a single mode.

In practice, the REC may be an REC that supports multiple modes. A CPRI link exists between one port of the RE and a port of a module supporting the first mode in the REC; another CPRI link exists between the other port of the RE and a port of a module supporting the second mode in the REC; and a data link exists between the module supporting the first mode and the module supporting the second mode. For example, the first standard is Time Division-Long Term Evolution (abbreviated as TDL or TD-LTE), the second mode is Time Division-Synchronous Code Division Multiple Access (abbreviated as TDS or TD-SCDMA).

In this connection mode, a module that needs to transmit I/Q data in a divided manner in the REC divides the I/Q data that needs to be transmitted to the RE into two paths of I/Q data with different content. The module that needs to transmit I/Q data in a divided manner refers to the module that needs to transmit the I/Q data that needs to be transmitted to the RE in a divided manner. Afterward, the module that needs to transmit I/Q data in a divided manner transmits one path of divided I/Q data to the RE over the CPRI link between the RE and the module that supports the first mode, and transmits the other path of divided I/Q data to the module that supports the second mode over the data link between the module that supports the first mode and the module that supports the second mode. The module that supports the second mode transmits the other path of divided I/Q data to the RE over the CPRI link between the RE and the module that supports the second mode. That is to say, certain module or modules not only need to transmit one part of I/Q data that needs to be transmitted to the RE over the CPRI link between the RE and the module that supports the first mode to the RE, but also need to transmit the other part of I/Q data that needs to be transmitted to the RE over the CPRI link between the RE and the module that supports the second mode. In addition, certain REC or RECs may transmit the I/Q data that needs to be transmitted to the RE, to the RE only over the CPRI link between the RE and the module that supports the second mode.

In practice, the REC may be an REC that supports multiple modes. Two CPRI links exist between two ports of the REC and two ports of a module supporting the first mode in the REC; and a data link exists between the module supporting the first mode and a module supporting the second mode in the REC. For example, the first mode is TDL, and the second mode is TDS.

In this connection mode, the module that needs to transmit I/Q data in a divided manner in the REC divides the I/Q data that needs to be transmitted to the RE into two paths of I/Q data, transmits one path of divided I/Q data to the RE over one CPRI link between the RE and the module that supports the first mode, and transmits the other path of divided I/Q data to the RE over the other CPRI link between the RE and the module that supports the first mode. That is to say, certain REC or RECs transmit the I/Q data to the RE over the two CPRI links between the RE and the module that supports the first mode. In addition, in order to transmit the I/Q data that needs to be transmitted to the RE, to the RE, some modules need to use the data link between the module that supports the first mode and the module that supports the second mode and one CPRI link between the RE and the module that supports the first mode.

Figure 8:
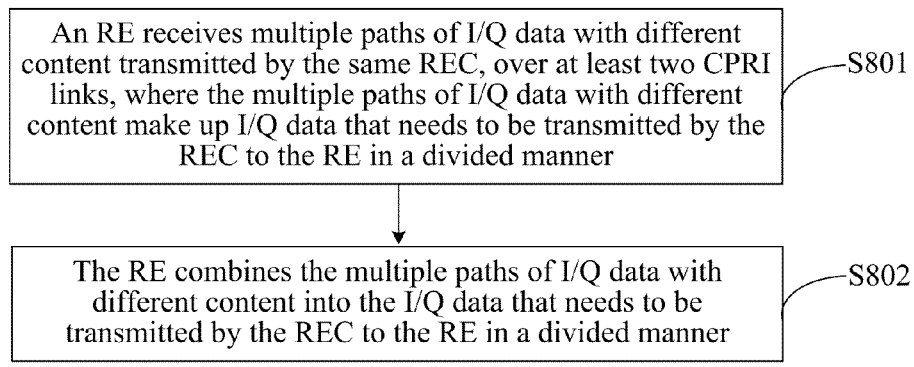
FIG. 8 is a flowchart of a method for processing CPRI data in a radio base station according to an embodiment of the present invention.

The foregoing embodiment is described from the perspective of the REC. The embodiment of the present invention is described from the perspective of the RE in the following. Accordingly, an embodiment of the present invention provides a method for processing CPRI data in a radio base station. As shown in FIG. 8, the method includes the following steps.

S801: An RE receives multiple paths of I/Q data with different content transmitted by the same REC, over at least two CPRI links, where the multiple paths of I/Q data with different content make up I/Q data that needs to be transmitted by the REC to the RE in a divided manner.

S802: The RE combines the multiple paths of I/Q data with different content into the I/Q data that needs to be transmitted by the REC to the RE in a divided manner.

In S801, the RE may receive multiple paths of I/Q data with different content transmitted by the same REC. Generally, the number of paths of the I/Q data received by the RE and transmitted by the same REC is the same as the number of CPRI links.

In S802, the RE combines the multiple paths of I/Q data with different content, and the combined I/Q data makes up the complete data transmitted by the same REC to the RE.

In practice, the REC may be an REC that supports a single mode. Two CPRI links exist between two ports of the REC that supports a single mode and two ports of the RE.

In this connection mode, the RE receives two paths of I/Q data with different content transmitted by the REC that supports a single mode over two CPRI links; and combines the two paths of I/Q data with different content into I/Q data transmitted by the REC that supports a single mode to the RE. That is to say, the two CPRI links between the REC that supports a single mode and the RE can be simultaneously used to transmit the I/Q data that needs to be transmitted to the RE by the REC that supports a single mode.

In practice, the REC may be an REC that supports multiple modes. A CPRI link exists between one port of the RE and a port of a module supporting the first mode in the REC; another CPRI link exists between the other port of the RE and a port of a module supporting the second mode in the REC; and a data link exists between the module supporting the first mode and the module supporting the second mode. For example, the first mode is TDL, and the second mode is TDS.

In this connection mode, the RE receives one path of I/Q data transmitted by a module that needs to transmit I/Q data to the RE in a divided manner in the REC, over the CPRI link between the RE and the module that supports the first mode, receives the other path of I/Q data transmitted by the module needs to transmit I/Q data to the RE in a divided manner, over the CPRI link between the RE and the module that supports the second mode, where the other path of I/Q data transmitted by the module that needs to transmit I/Q data in a divided manner to the RE is received by the module that supports the second mode over the data link between the module that supports the first mode and the module that supports the second mode. The module that needs to transmit I/Q data in a divided manner refers to the module that needs to transmit the I/Q data that needs to be transmitted to the RE in a divided manner, and the two paths of I/Q data that needs to be transmitted by this module to the RE have different content. The RE combines the two paths of received I/Q data transmitted by the module that needs to transmit I/Q data in a divided manner to the RE into the I/Q data that needs to be transmitted by this module to the RE. That is to say, the CPRI link between the RE and the module supporting the first mode as well as the CPRI link between the RE and the module supporting the second mode can be simultaneously used to transmit the I/Q data that needs to be transmitted by certain module or modules to the RE. In addition, the RE may receive the I/Q data transmitted by certain module or modules to the RE only over the CPRI link between the RE and the module that supports the second mode.

In practice, the REC may be an REC that supports multiple modes. Two CPRI links exist between two ports of the RE and two ports of a module supporting the first mode in the REC; and a data link exists between the module supporting the first mode and a module supporting the second mode in the REC. For example, the first mode is TDL, and the second mode is TDS.

In this connection mode, the RE receives two paths of I/Q data with different content that needs to be transmitted by the module that needs to transmit I/Q data to the RE in a divided manner in the REC, over two CPRI links between the RE and the module that supports the first mode; and combines the two paths of I/Q data with different content into the I/Q data that needs to be transmitted to the RE by the module that needs to transmit I/Q data in a divided manner. That is to say, the two CPRI links between the RE and the module supporting the first mode can be simultaneously used to transmit the I/Q data that needs to bet transmitted by certain module or modules to the RE. In addition, the RE may receive the I/Q data that needs to be transmitted by certain module or modules only over one of the two CPRI links between the RE and the module that supports the first mode.

The foregoing two embodiments describe the process of transmitting I/Q data by the REC to the RE. The following two embodiments describe the process of transmitting I/Q data by the RE to the REC.

Figure 9:
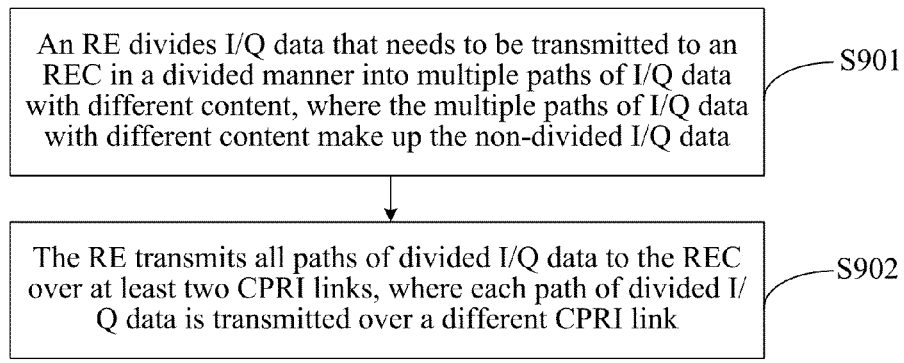
FIG. 9 is a flowchart of another method for transmitting CPRI data in a radio base station according to an embodiment of the present invention.

First, a method for transmitting CPRI data in a radio base station is introduced. As shown in FIG. 9, the method includes the following steps.

S901: An RE divides I/Q data that needs to be transmitted to an REC in a divided manner into multiple paths of I/Q data with different content, where the multiple paths of I/Q data with different content make up the non-divided I/Q data.

S902: The RE transmits all paths of divided I/Q data to the REC over at least two CPRI links, where each path of divided I/Q data is transmitted over a different CPRI link.

In S901, the RE divides I/Q data that needs to be transmitted to the REC in a divided manner into multiple paths of I/Q data with different content, that is, the RE divides the I/Q data that needs to be transmitted to the REC and then transmits the divided data to the REC. Generally, the number of paths of the I/Q data divided by the RE is the same as the number of CPRI links.

In step S902, the RE transmits the divided I/Q data over every CPRI link. Generally, the RE transmits one path of divided I/Q data over each CPRI link, and the I/Q data transmitted by the RE to the same REC over each CPRI link has different content.

In practice, the REC may be an REC that supports a single mode. Two CPRI links exist between two ports of the REC that supports a single mode and the ports of the RE.

In this connection mode, the RE divides the I/Q data that needs to be transmitted to the REC that supports a single mode into two paths of I/Q data with different content, transmits one path of divided I/Q data to the REC that supports a single mode over one CPRI link, and transmits the other path of divided I/Q data to the REC that supports a single mode over the other CPRI link. That is to say, the two CPRI links between the REC that supports a single mode and the RE can be simultaneously used to transmit the I/Q data that needs to be transmitted by the RE to the REC that supports a single mode.

In practice, the REC may be an REC that supports multiple modes. A CPRI link exists between one port of the RE and a port of a module supporting the first mode in the REC; another CPRI link exists between the other port of the RE and a port of a module supporting the second mode in the REC; and a data link exists between the module supporting the first mode and the module supporting the second mode. For example, the first mode is TDL, and the second mode is TDS.

In this connection mode, the RE divides the I/Q data that needs to be transmitted to the REC in a divided manner into two paths of I/Q data with different content, transmits one path of divided I/Q data to a module for receiving divided I/Q data in the REC over the CPRI link between the RE and the module that supports the first mode, and transmits the other path of divided I/Q data to the module that supports the second mode over the CPRI link between the RE and the module that supports the second mode, where the module supporting the second mode transmits the other path of divided I/Q data to the module for receiving divided I/Q data over the data link between the module supporting the first mode and the module supporting the second mode. That is to say, the RE can transmit a part of I/Q data that needs to be transmitted to certain module or modules, to the module or modules over the CPRI link between the RE and the module that supports the first mode, and can transmit the other part of I/Q data that needs to be transmitted to the module or modules, to the module or modules over the CPRI link between the RE and the module that supports the second mode. In addition, the RE can transmit the I/Q data that needs to be transmitted to the module or modules, to the module or modules only over the CPRI link between the RE and the module that supports the second mode.

In practice, the REC may be an REC that supports multiple modes. Two CPRI links exist between two ports of the RE and two ports of the module supporting the first mode in the REC; and a data link exists between the module supporting the first mode and the module supporting the second mode in the REC. For example, the first mode is TDL, and the second mode is TDS.

In this connection mode, the RE divides the I/Q data that needs to be transmitted to the REC in a divided manner into two paths of I/Q data with different content, transmits one path of divided I/Q data to the module for receiving divided I/Q data in the REC over one CPRI link between the RE and the module that supports the first mode, and transmits the other path of divided I/Q data to the module for receiving divided I/Q data over the other CPRI link between the RE and the module that supports the first mode. That is to say, the RE can transmit the I/Q data that needs to be transmitted to certain module or modules, to the module or modules over the two CPRI links between the RE and the module supporting the first mode simultaneously. In addition, the RE may transmit the I/Q data that needs to be transmitted to certain module or modules, to the module or modules only over one CPRI link between the RE and the module that supports the first mode and the data link between the module that supports the first mode and the module that supports the second mode.

Figure 10:
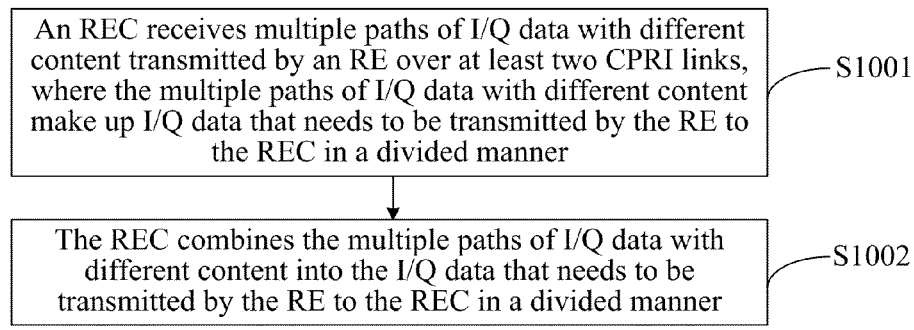
FIG. 10 is a flowchart of another method for processing CPRI data in a radio base station according to an embodiment of the present invention.

The foregoing embodiment is described from the perspective of the RE. The embodiment of the present invention is described from the perspective of the REC in the following. Accordingly, an embodiment of the present invention provides a method for processing CPRI data in a radio base station. As shown in FIG. 10, the method includes the following steps.

S1001: An REC receives multiple paths of I/Q data with different content transmitted by an RE over at least two CPRI links, where the multiple paths of I/Q data with different content make up I/Q data that needs to be transmitted by the RE to the REC in a divided manner.

S1002: The REC combines the multiple paths of I/Q data with different content into the I/Q data that needs to be transmitted by the RE to the REC in a divided manner.

In S1001, the REC may receive multiple paths of I/Q data with different content transmitted by the RE. Generally, the number of paths of the I/Q data received by the REC and transmitted by the RE is the same as the number of CPRI links.

In S1002, the REC combines the multiple paths of I/Q data with different content, and the combined I/Q data makes up the complete data transmitted by the RE to the REC.

In practice, the REC may be an REC that supports a single mode. Two CPRI links exist between two ports of the REC that supports a single mode and two ports of the RE.

In this connection mode, the REC that supports a single mode receives two paths of I/Q data with different content transmitted by the RE, over two CPRI links, and combines the two paths of I/Q data with different content into the non-divided I/Q data transmitted by the RE to the REC. That is to say, the two CPRI links between the REC that supports a single mode and the RE can be simultaneously used to transmit the I/Q data transmitted by the RE to the REC that supports a single mode.

In practice, the REC may be an REC that supports multiple modes. A CPRI link exists between one port of the RE and a port of a module supporting the first mode in the REC; another CPRI link exists between the other port of the RE and a port of a module supporting the second mode in the REC; and a data link exists between the module supporting the first mode and the module supporting the second mode. For example, the first mode is TDL, and the second mode is TDS.

In this connection mode, a module for receiving divided I/Q data in the REC receives one path of I/Q data transmitted to the module for receiving divided I/Q data by the RE, over the CPRI link between the RE and the module that supports the first mode, and receives the other path of I/Q data transmitted to the module for receiving divided I/Q data by the RE, over the data link between the module that supports the first mode and the module that supports the second mode. The other path of I/Q data transmitted to the module for receiving divided I/Q data by the RE is received by the module that supports the second mode over the CPRI link between the RE and the module that supports the second mode. The two paths of I/Q data transmitted by the RE to the module for receiving divided I/Q data have different content. The module for receiving divided I/Q data combines the two paths of received I/Q data with different content transmitted to the module for receiving divided I/Q data by the RE into the I/Q data transmitted to the module for receiving divided I/Q data by the RE. That is to say, certain module or modules not only can receive one part of I/Q data transmitted to the module or modules by the RE, over the CPRI link between the RE and the module that supports the first mode, but also can receive the other part of I/Q data transmitted to the module or modules by the RE, over the CPRI link between the RE and the module that supports the second mode and the data link between the module that supports the first mode and the module that supports the second mode. In addition, certain module or modules may receive the I/Q data transmitted to the module or modules the RE only over the CPRI link between the RE and the module that supports the second mode.

In practice, the REC may be an REC that supports multiple modes. Two CPRI links exist between two ports of the RE and two ports of the module supporting the first mode in the REC; and a data link exists between the module supporting the first mode and the module supporting the second mode in the REC. For example, the first mode is TDL, and the second mode is TDS.

In this connection mode, the module for receiving divided I/Q data in the REC receives two paths of I/Q data with different content transmitted to the module for receiving divided I/Q data by the RE, over two CPRI links between the RE and the module that supports the first mode, combines the two paths of received I/Q data with different content transmitted to the module for receiving divided I/Q data by the RE into the I/Q data transmitted to the module for receiving divided I/Q data by the RE. That is to say, the two CPRI links between the RE and the module supporting the first mode can be simultaneously used to transmit the I/Q data transmitted to certain module or modules by the RE. In addition, the module that supports the first mode may receive the I/Q data transmitted to certain module or modules by the RE, over one CPRI link between the RE and the module that supports the first mode. Afterward, the module that supports the first mode transmits the I/Q data transmitted to the module or modules by the RE, over the data link between the module that supports the first mode and the module that supports the second mode.

The method for transmitting data is described from the perspective of the REC and the RE respectively above. As expressed in another way, an embodiment of the present invention provides a method for transmitting CPRI data in a radio base station, which is applicable to the radio base station with at least two CPRI links between an REC and an RE. The method includes: dividing, by either of the REC and the RE which serve as a peer end of each other, I/Q data that needs to be transmitted to the peer end in a divided manner into multiple paths of I/Q data with different content; and transmitting, by the end, all paths of divided I/Q data to the peer end over the at least two CPRI links, where each path of divided I/Q data is transmitted over a different CPRI link.

The method for processing data is described from the perspective of the REC and the RE respectively above. As expressed in another way, an embodiment of the present invention provides a method for processing CPRI data in a radio base station, which is applicable to the radio base station with at least two CPRI links between the REC and the RE. The method includes: receiving, by either of the RE and the REC which serves as a peer end of each other, multiple paths of I/Q data with different content transmitted by the peer end, over the at least two CPRI links, where the multiple paths of I/Q data make up I/Q data that needs to be transmitted by one end to the peer end in a divided manner; and combining, by the end, the multiple paths of I/Q data with different content into the I/Q data that needs to be transmitted by the peer end to this end in a divided manner.

Figure 11:
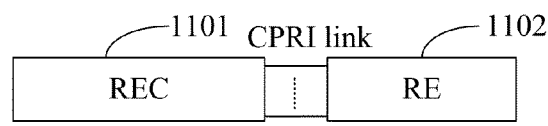
FIG. 11 is a schematic diagram illustrating a logical structure of a radio base station according to an embodiment of the present invention.

As mentioned above, all embodiments of the present invention are applicable to radio base stations. Accordingly, an embodiment of the present invention provides a radio base station. As shown in FIG. 11, the radio base station includes an REC 1101 and an RE 1102. At least two CPRI links exist between the REC 1101 and the RE 1102. I/Q data exchanged between the REC 1101 and the RE 1102 is transmitted over the at least two CPRI links.

In practice, the REC 1101 may be an REC that supports a single mode. Two CPRI links exist between two ports of the REC that supports a single mode and two ports of the RE.

In this connection mode, the I/Q data exchanged between the REC that supports a single mode and the RE is transmitted over two CPRI links, and control data exchanged between the REC that supports a single mode and the RE is transmitted over either of the two CPRI links.

In practice, the REC 1101 may be an REC that supports multiple modes. A CPRI link exists between one port of the RE and a port of a module supporting the first mode in the REC; another CPRI link exists between the other port of the RE and a port of a module supporting the second mode in the REC; and a data link exists between the module supporting the first mode and the module supporting the second mode. For example, the first mode is TDL, and the second mode is TDS.

In this connection mode, as regards I/Q data exchanged between the RE and a module that needs to transmit I/Q data in a divided manner in the REC, and, as regards I/Q data exchanged between the RE and a module for receiving divided I/Q data in the REC, the I/Q data is transmitted over a CPRI link between the RE and the module that supports the first mode, a CPRI link between the RE and the module that supports the second mode, and a data link between the module that supports the first mode and the module that supports the second mode; and as regards control data exchanged between the RE and the module that needs to transmit I/Q data in a divided manner, and as regards control data exchanged between the RE and the module for receiving divided I/Q data, the control data is transmitted over the CPRI link between the RE and the module that supports the first mode. The module that needs to transmit I/Q data in a divided manner refers to the module that needs to transmit the I/Q data that needs to be transmitted to the RE in a divided manner, and the module for receiving divided I/Q data refers to the module for receiving the I/Q data transmitted by the RE in a divided manner.

In this connection mode, as regards I/Q data exchanged between the RE and a module that does not need to transmit I/Q data in a divided manner in the REC, and, as regards I/Q data exchanged between the RE and a module that does not need to receive divided I/Q data in the REC, the I/Q data is transmitted over the CPRI link between the RE and the module that supports the second mode; and as regards control data exchanged between the RE and the module that does not need to transmit I/Q data in a divided manner, and as regards control data exchanged between the RE and the module that does not need to receive divided I/Q data in the REC, the control data is transmitted over the CPRI link between the RE and the module that supports the second mode. The module that does not need to transmit I/Q data in a divided manner refers to the module that does not need to transmit the I/Q data that needs to be transmitted to the RE in a divided manner, and the module that does not need to receive divided I/Q data refers to the module that does not need to receive the I/Q data transmitted by the RE in a divided manner.

In practice, the REC 1101 may be an REC that supports multiple modes. Two CPRI links exist between two ports of the RE and two ports of the module supporting the first mode in the REC; and a data link exists between the module supporting the first mode and the module supporting the second mode in the REC. For example, the first mode is TDL, and the second mode is TDS.

In this connection mode, as regards I/Q data exchanged between the RE and the module that needs to transmit I/Q data in a divided manner in the REC, and, as regards I/Q data exchanged between the RE and the module for receiving divided I/Q data in the REC, the I/Q data is transmitted over the two CPRI links between the RE and the module that supports the first mode; and as regards control data exchanged between the RE and the module that needs to transmit I/Q data in a divided manner, and as regards control data exchanged between the RE and the module for receiving divided I/Q data in the REC, the control data is transmitted over one CPRI link between the RE and the module that supports the first mode. The module that needs to transmit I/Q data in a divided manner refers to the module that needs to transmit the I/Q data that needs to be transmitted to the RE in a divided manner, and the module for receiving divided I/Q data refers to the module for receiving the I/Q data transmitted by the RE in a divided manner.

In this connection mode, as regards I/Q data exchanged between the RE and the module that does not need to transmit I/Q data in a divided manner in the REC, and, as regards I/Q data exchanged between the RE and the module that does not need to receive divided I/Q data in the REC, the I/Q data is transmitted over the data link between the module that supports the first mode and the module that supports the second mode, and over either of the CPRI links between the RE and the module that supports the first mode; and as regards control data exchanged between the RE and the module that does not need to transmit I/Q data in a divided manner, and as regards control data exchanged between the RE and the module that does not need to receive divided I/Q data, the control data is transmitted over the data link between the module that supports the first mode and the module that supports the second module, and over one CPRI link between the RE and the module that supports the first mode. The module that does not need to transmit I/Q data in a divided manner refers to the module that does not need to transmit the I/Q data that needs to be transmitted to the RE in a divided manner, and the module that does not need to receive divided I/Q data refers to the module that does not need to receive the I/Q data transmitted by the RE in a divided manner.

As for description about the radio base station, reference can be made to the description in the method embodiments above.

To make persons of ordinary skill in the art understand the present invention better, the embodiments of the present invention are described in detail below.

First, three modes for transmitting CPRI data are introduced.

(1) CPRI Data Transmission Mode of a Single-Mode Base Station

Figure 12:
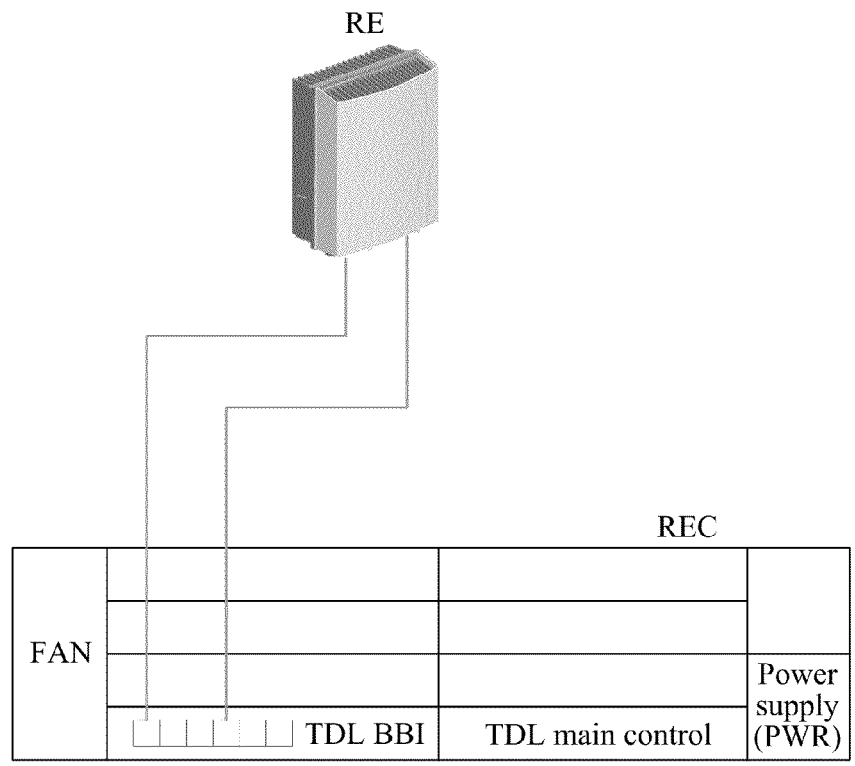
FIG. 12 is a schematic diagram illustrating a connection structure of a single-mode base station according to an embodiment of the present invention.

As shown in FIG. 12, two ports of an RE are connected with two ports of a base band interface unit of a TDL-enabled REC through cables to form two CPRI links between the RE and the TDL-enabled REC.

Figure 13:
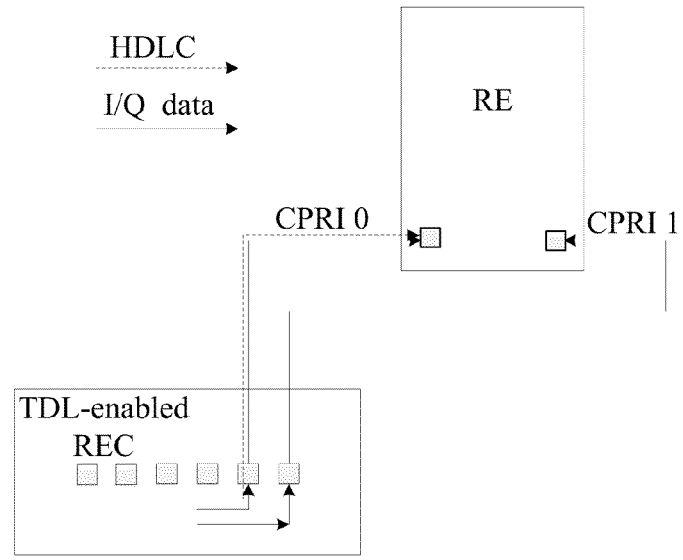
FIG. 13 is a schematic diagram illustrating a mode of transmitting I/Q data and HDLC data based on the connection structure shown in FIG. 12 according to an embodiment of the present invention.

FIG. 13 shows a mode of transmitting I/Q data and High-Level Data Link Control (HDLC) data. In this CPRI data transmission mode, the I/Q data needs to be transmitted on the two CPRI links, while the HDLC data needs to be transmitted on only one CPRI link, and the other CPRI link serves as a backup path for transmitting the HDLC data. It should be noted that the HDLC data is a form of control data, and is taken as an example for description herein. In fact, the control data may be other forms of data such as Ethernet data.

(2) First Mode of Transmitting CPRI Data of a Multi-Mode Base Station

Figure 14:
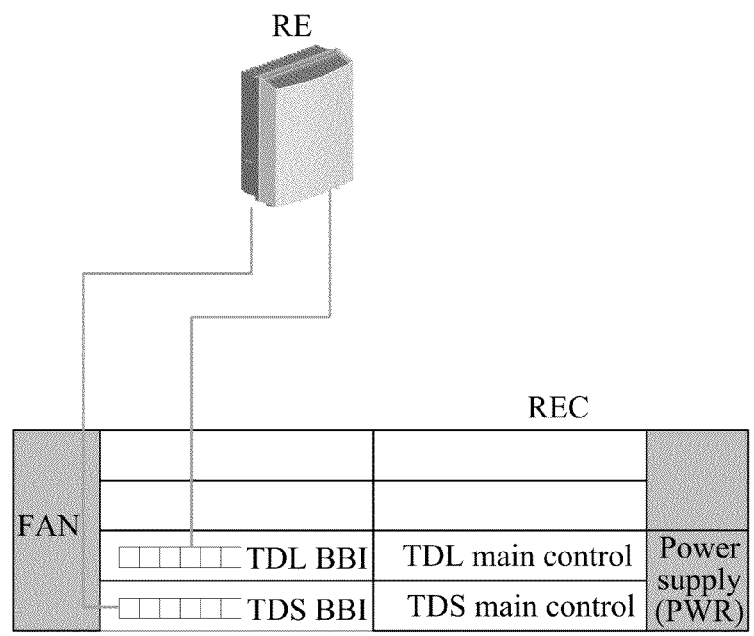
FIG. 14 is a schematic diagram illustrating a connection structure of a dual-mode base station according to an embodiment of the present invention.

As shown in FIG. 14, one port of an RE is connected with one port of a base band interface unit of a TDL-enabled module in an REC through cables to form one CPRI link between the RE and the REC, and the other port of the RE is connected with the other port of the base band interface unit of the TDS-enabled module in the REC to form the other CPRI link between the RE and the REC. Data is transmitted between the base band interface unit of the TDL-enabled module and the base band interface unit of the TDS-enabled module, for example, through a backplane bus. The backplane bus forms a data link between the TDL-enabled module and the TDS-enabled module. Definitely, data may also be transmitted between the modules that support different modes by other means, for example, through cables. The backplane bus is merely taken as an example of the transmission means.

Figure 15:
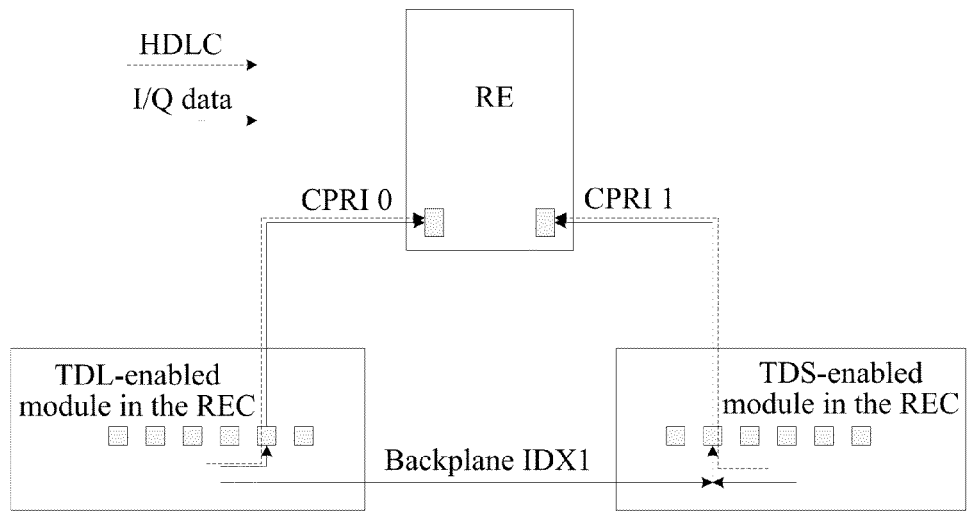
FIG. 15 is a schematic diagram illustrating a mode of transmitting I/Q data and HDLC data based on the connection structure shown in FIG. 14 according to an embodiment of the present invention.

FIG. 15 shows a mode of transmitting I/Q data and HDLC data. In this CPRI data transmission mode, the I/Q data needs to be transmitted on two CPRI links, and the HDLC data needs to be transmitted on only one CPRI link, and the other CPRI link serves as a backup path for transmitting the HDLC data. In practice, persons of ordinary skill in the art can set the specific CPRI link for transmitting the HDLC data according to actual needs. The specific CPRI link for transmitting the HDLC data is not limited herein. Similarly, the HDLC data is a form of control data, and is taken as an example for description herein. In fact, the control data may be other form of data such as Ethernet data.

(3) Second Mode of Transmitting CPRI Data of a Multi-Mode Base Station

Figure 16:
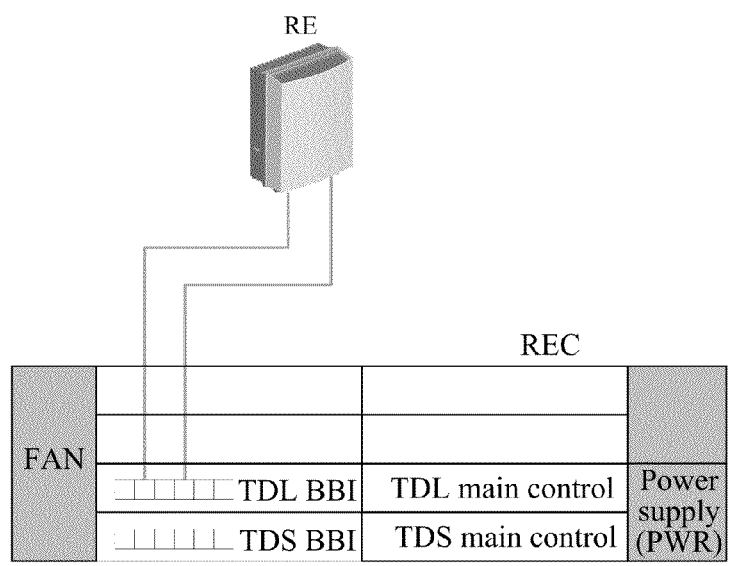
FIG. 16 is a schematic diagram illustrating another connection structure of a dual-mode base station according to an embodiment of the present invention.

As shown in FIG. 16, two ports of an RE are connected with two ports of a base band interface unit of a TDL-enabled module in an REC through cables to form two CPRI links between the RE and the REC; and data is transmitted between the base band interface unit of the TDL-enabled module and the base band interface unit of the TDS-enabled module in the REC through a backplane bus. The backplane bus forms a data link between the TDL-enabled module and the TDS-enabled module.

Figure 17:
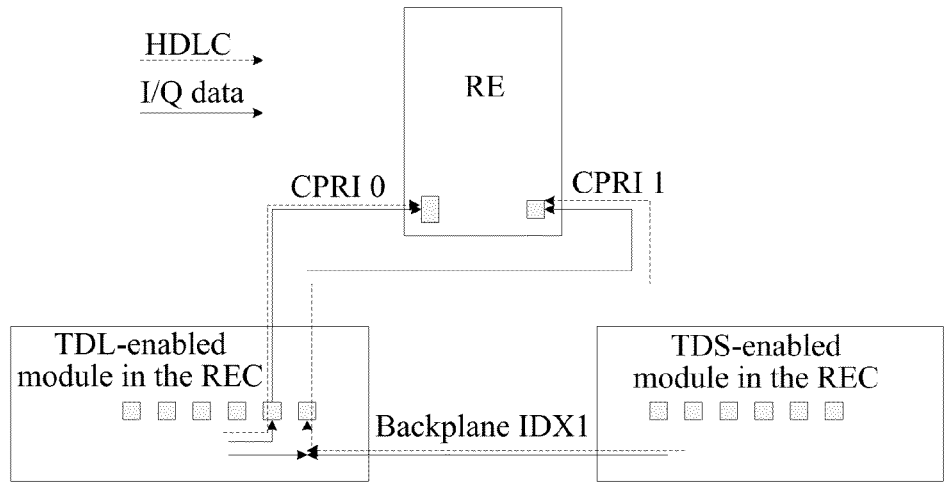
FIG. 17 is a schematic diagram illustrating a mode of transmitting I/Q data and HDLC data of a dual-mode base station based on the connection structure in FIG. 16 according to an embodiment of the present invention.

FIG. 17 shows a mode of transmitting I/Q data and HDLC data. In this CPRI data transmission mode, the I/Q data needs to be transmitted over two CPRI links, the HDLC data of the TDL-enabled module is transmitted over the link corresponding to CPRI0, and the HDLC data of the TDS-enabled module is transmitted over the link corresponding to CPRI1. In practice, persons of ordinary skill in the art may set the specific CPRI link for transmitting the specific data at their discretion. Herein, it is assumed that the HDLC data of the TDL-enabled module is transmitted over the link corresponding to CPRI0, and the HDLC data of the TDS-enabled module is transmitted over the link corresponding to CPRI1. In fact, it is also practicable that the HDLC data of the TDL-enabled module is transmitted over the link corresponding to CPRI1 and the HDLC data of the TDS-enabled module is transmitted over the link corresponding to CPRI0.

In practice, a flag may be set in the REC and the RE to indicate a link mode and indicate the master/slave attribute of two ports of the RE. The link mode indicates whether transmission in a divided manner is required. Accordingly, the embodiments of the present invention extend the definition of control word Z.208.0, and defines bit 3-bit 1 as link mode, which is written by the high-level software of the REC into the Field Programmable Gate Array (FPGA) logic register. The extended Z.208.0 is shown in Table 6. It should be noted that the extended control word Z.208.0 is only one implementation manner, and persons of ordinary skill in the art may extend other control words such as Z.208.1 in practice.

TABLE 6

| BYTE Index | Function | Comment |
| --- | --- | --- |
| Z.208.0 | M or S attribute and Link Mode | BIT3-BIT1: link mode<br>000: unidirectional link mode<br>011: load sharing mode<br>BIT0: indicates whether the attribute of the port that sends the CPRI frame is master or slave: "1" represents master, and "0" represents slave |

As shown in Table 6, the unidirectional link mode indicates that the data does not need to be transmitted in a divided manner. In the unidirectional link mode, the attribute of the two ports of the RE is either master or slave. A Slave port receives downlink data and sends uplink data, and a Master port receives uplink data and forwards downlink data. In fact, the link in this mode is spliced out of two CPRI links.

As shown in Table 6, the load sharing mode indicates that the data needs to be transmitted in a divided manner. In the load sharing mode (that is, the I/Q data is transmitted over multiple CPRI links), the master/slave attribute of the two ports of the RE is set to "slave", and the receiving and the sending of the I/Q data and the HDLC data are adjusted accordingly. The Hop Number is scanned from one end of the CPRI link to the other end.

The working mode of the CPRI link is configurable by the user. Definitely, the working mode of the CPRI link may be configured in other modes such as automatic decision of software.

The REC software configures the link mode for an interface device (such as FPGA, Application Specific Integrated Circuit (ASIC)). The interface device transmits the link mode to the RE by using bit 3-bit 1 of the control word Z.208.0.

The HOP scan (that is, scanning Hop Number) mentioned above is described below.

In the HOP scan, the CPRI logic of the RE first judges the mode of the received link. If the mode of the received link is b000, the CPRI logic considers that the HOP scan needs to be performed in the unidirectional link mode, sets the port on the receiving side to "Slave", sets the port on the other side to "Master", add 1 to the Hop Number, and sends the Hop Number out on the master port.

Figure 18:
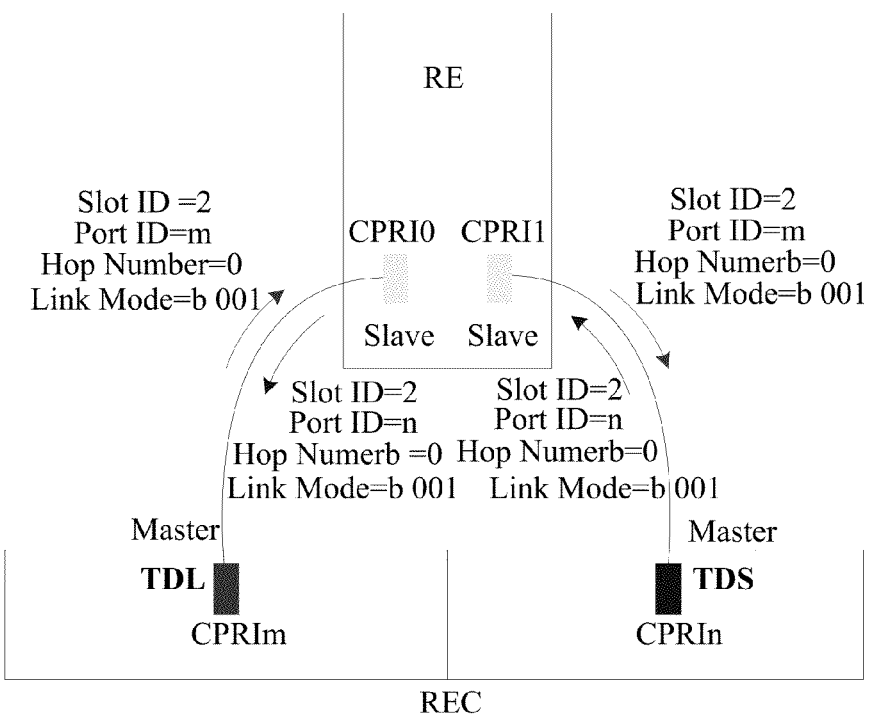
FIG. 18 is a schematic diagram illustrating a HOP scan process in a load-sharing mode according to an embodiment of the present invention.

If the mode of the received link is b011, the CPRI logic considers that the HOP scan needs to be performed in the load sharing mode, sets the port on the receiving side to "Slave", sets the port on the other side to "Slave" too, sends the Hop Number received at one port out on the other port. In this case, the Hot Number is equal to 0. For details, reference can be made to the HOP scan process in the load sharing mode shown in FIG. 18.

Figure 19:
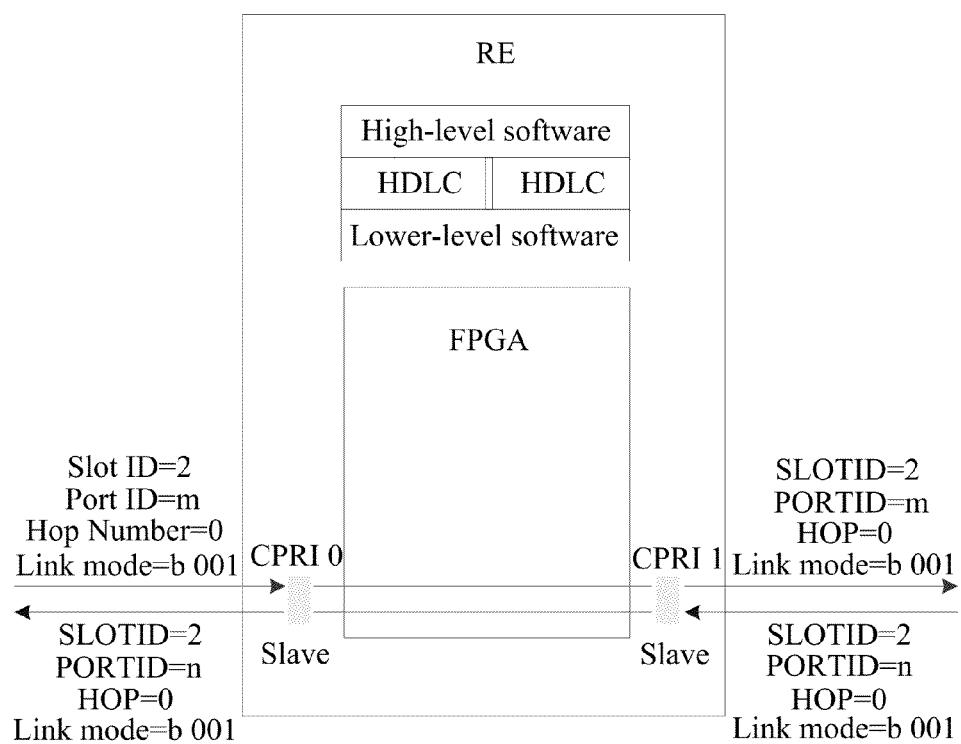
FIG. 19 is a schematic diagram illustrating control words transmitted into or out of an RE port in a load-sharing mode according to an embodiment of the present invention.

FIG. 19 shows control words transmitted into or out of an RE port in a load-sharing mode. The control words received at CPRI0 and the control words sent out from CPRI1 are: Slot ID=2, Port ID=m, Hop Number=0, and Link mode=b011, respectively; and the control words received at CPRI1 and the control words sent out of CPRI0 are: Slot ID=2, Port ID=n, Hop Number=0, and Link mode=b011, respectively.

It can be seen from the foregoing embodiments that I/Q data processing is an important process of the embodiments of the present invention. The I/Q data processing process is described in detail below.

(1) CPRI Data Transmission Mode of a Single-Mode Base Station

Figure 20:
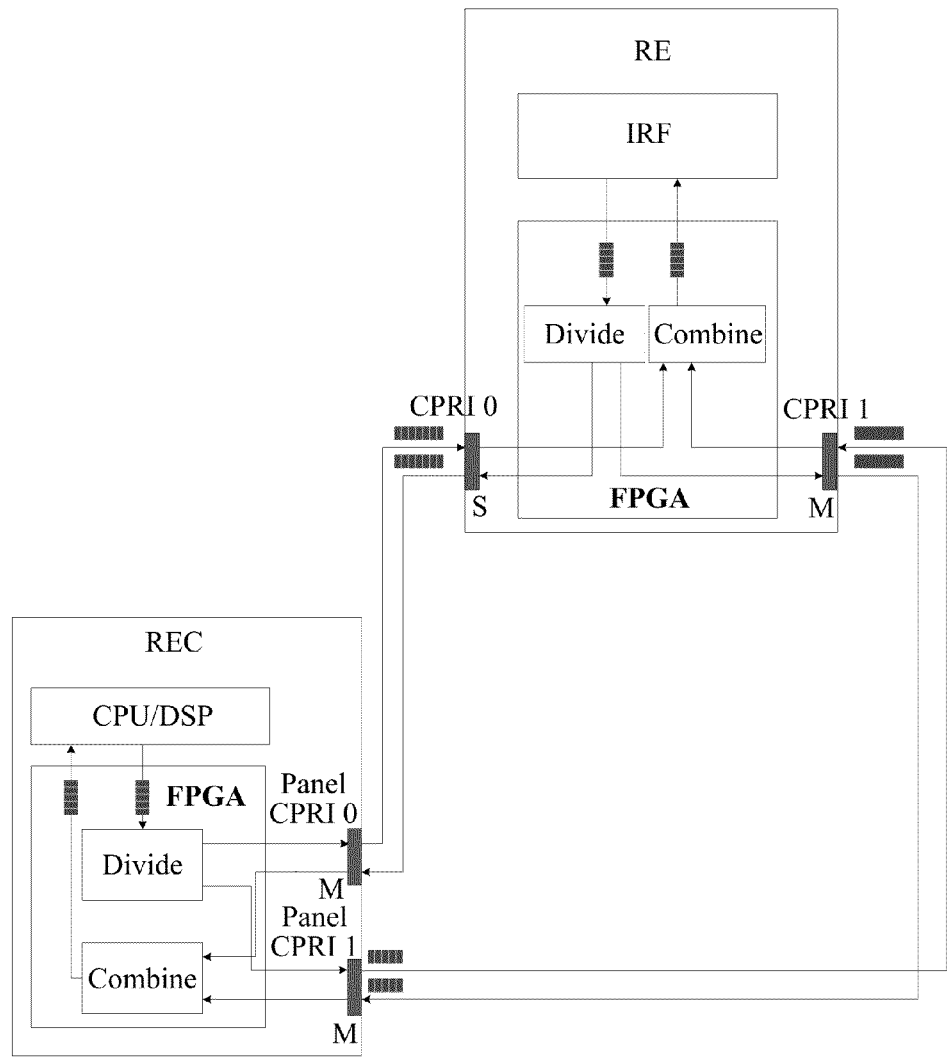
FIG. 20 is a schematic diagram illustrating a mode of transmitting I/Q data from a single-mode base station in a load-sharing mode according to an embodiment of the present invention.

As shown in FIG. 20, an RE receives I/Q data from CPRI0 and CPRI1 respectively, and the two paths of I/Q data are combined. The combined I/Q data arrives at an Intermediate Radio Frequency (IRF) signal processing module. The high-level software needs to configure the A×C information occupied by each carrier on this RE, the information about the receiving CPRI, and the information about the transmitting CPRI for the FPGA. When sending the I/Q data, the FPGA sends the I/Q data to the corresponding port according to the CPRI information configured by the high-level software. When receiving the I/Q data, the FPGA receives the I/Q data from the corresponding port according to the CPRI information configured by the high-level software.

The I/Q data processing mode on an REC side is the same as that on the RE side, and also involves combining and dividing the I/Q data according to the port information of the A×C.

(2) First Mode of Transmitting CPRI Data of a Dual-Mode Base Station

Figure 21A:
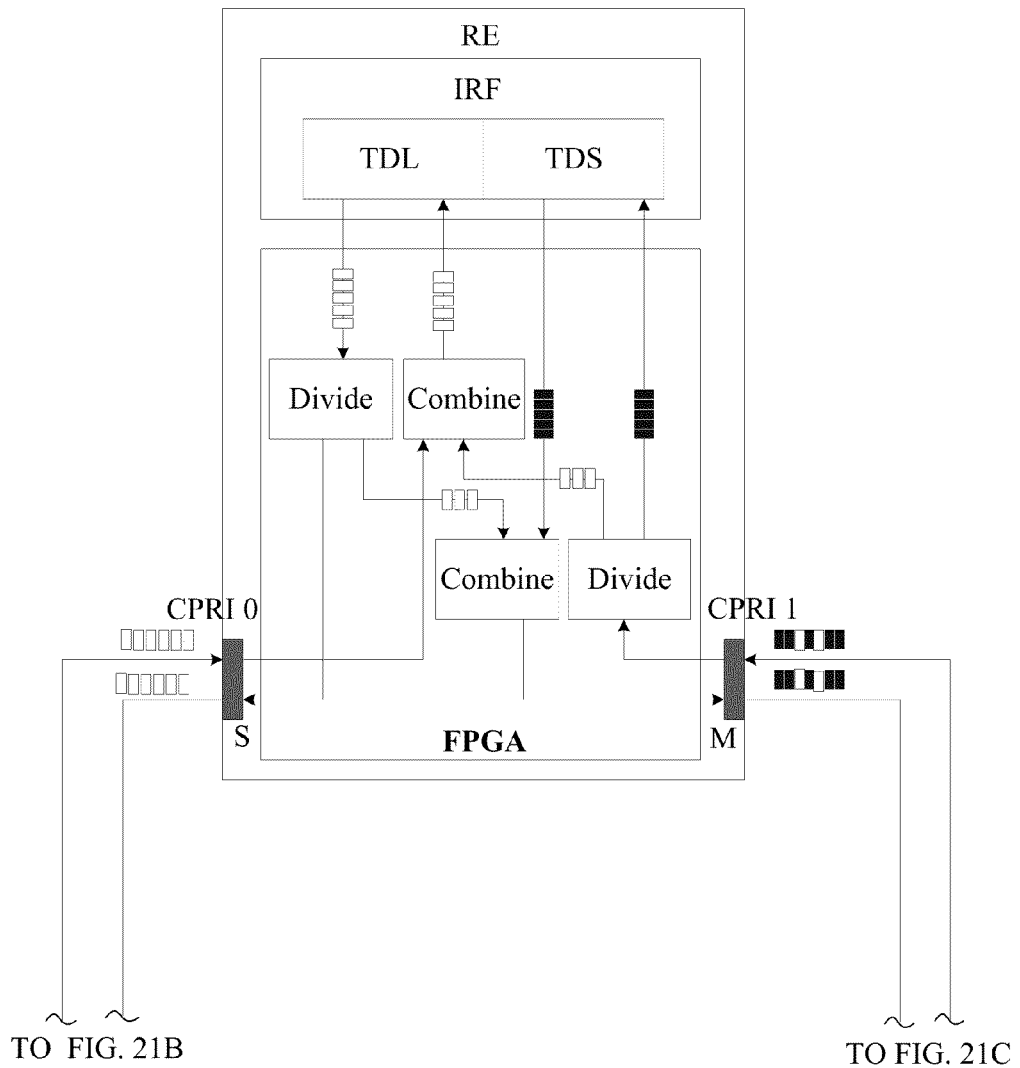
FIG. 21A, FIG. 21B and FIG. 21C are a schematic diagram illustrating a mode of transmitting I/Q data from a dual-mode base station in a load-sharing mode according to an embodiment of the present invention.
Figure 21B:
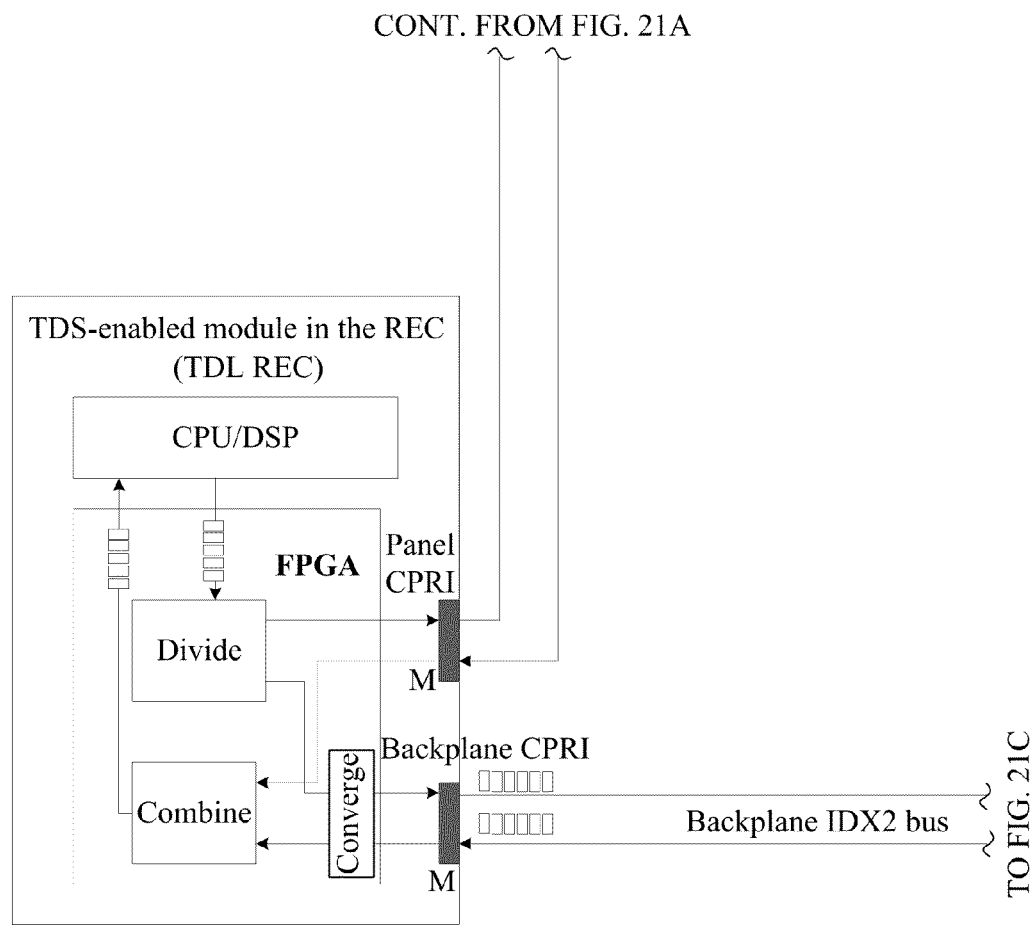
Figure 21C:
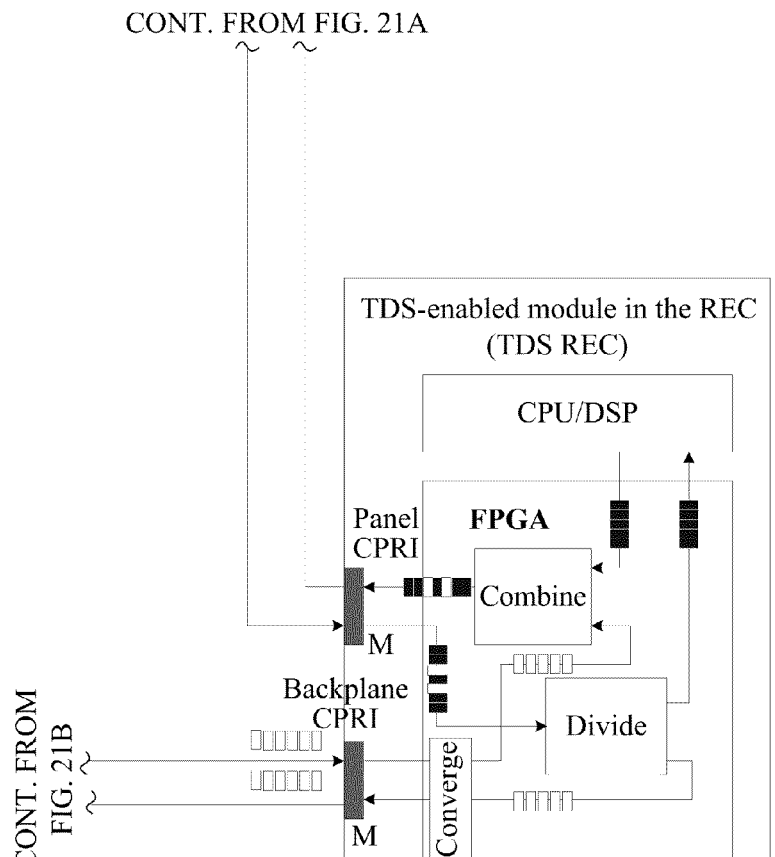

As shown in FIG. 21A, FIG. 21B, and FIG. 21C, two ports of an RE are connected to a port of a TDL-enabled module in an REC, and to a port of a TDS-enabled module in the REC, respectively. Data transmitted to the RE by the TDL-enabled module needs to be shared by the two ports of the RE, while data transmitted to the RE by the TDS-enabled module does not need to be shared by the two ports of the RE.

For the TDL-enabled module, I/Q data is divided at the granularity of the A×C into the panel link direction and the backplane link direction. If the bandwidth of the backplane link of the base station is greater than the bandwidth of the panel link, a convergence function may be implemented on the backplane side.

For the TDS-enabled module, the panel port needs to perform convergence and combine the data transmitted to the RE by the TDL-enabled module and the data transmitted to the RE by the TDS-enabled module. Similarly, if the bandwidth of the backplane link of the base station is greater than the bandwidth of the panel link, the convergence function may be implemented on the backplane side. When receiving data, the TDS-enabled module divides the received data into the panel link direction and the backplane link direction.

For the RE, the data that needs to be transmitted to the TDL-enabled module needs to be divided into two paths; one path arrives at the TDL-enabled module directly through CPRI0, and the other path needs to be combined with the data transmitted to the TDS-enabled module, and then the combined data arrives at the TDS-enabled module. When receiving data, the data transmitted by the TDL-enabled module is received from CPRI1, and the data transmitted by the TDS-enabled module is received from CPRI1. The two parts of data are combined, and then divided. The divided data that needs to be transmitted by the TDL-enabled module is combined with the data received from CPRI0 and transmitted by the TDL-enabled module, and then sent to the IRF.

(3) Second Mode of Transmitting CPRI Data of a Dual-Mode Base Station

Figure 22A:
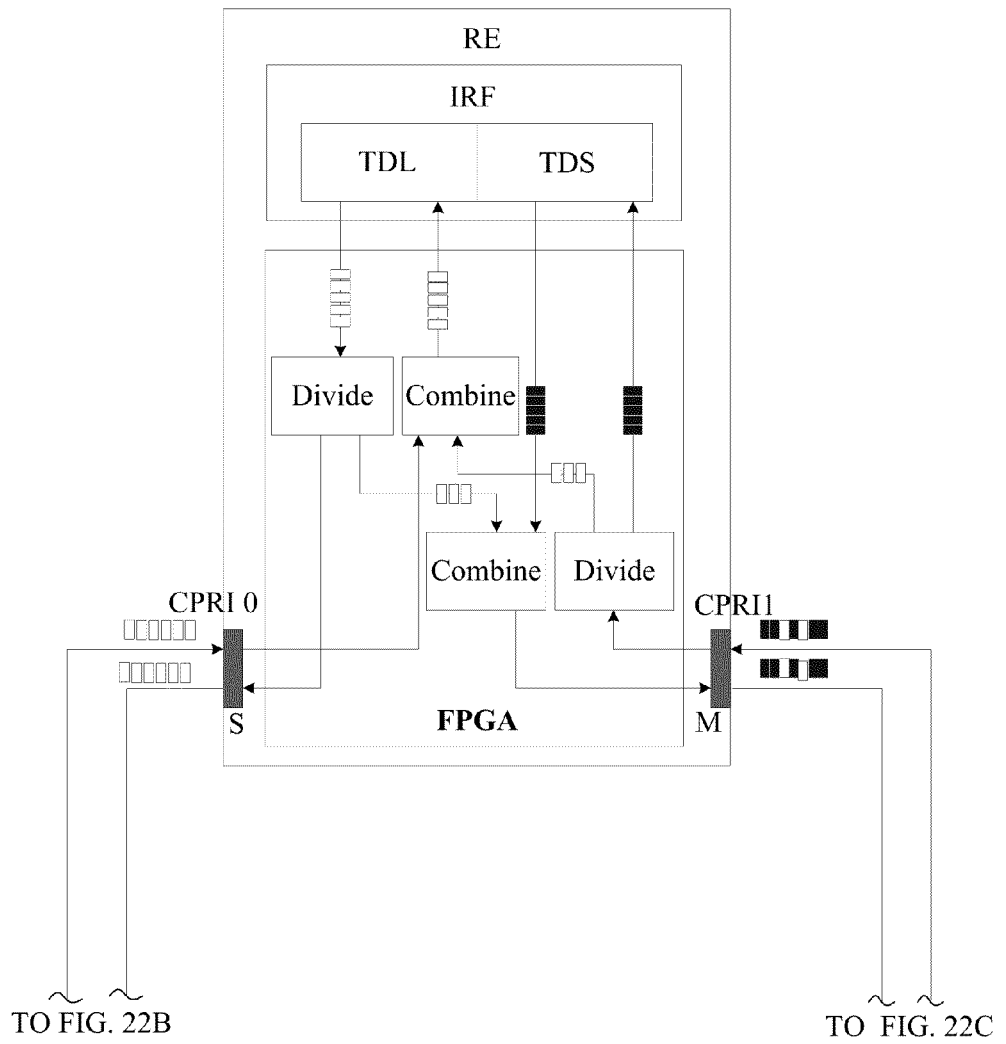
FIG. 22A, FIG. 22B, and FIG. 22C are a schematic diagram illustrating another mode of transmitting I/Q data from a dual-mode base station in a load-sharing mode according to an embodiment of the present invention.
Figure 22B:
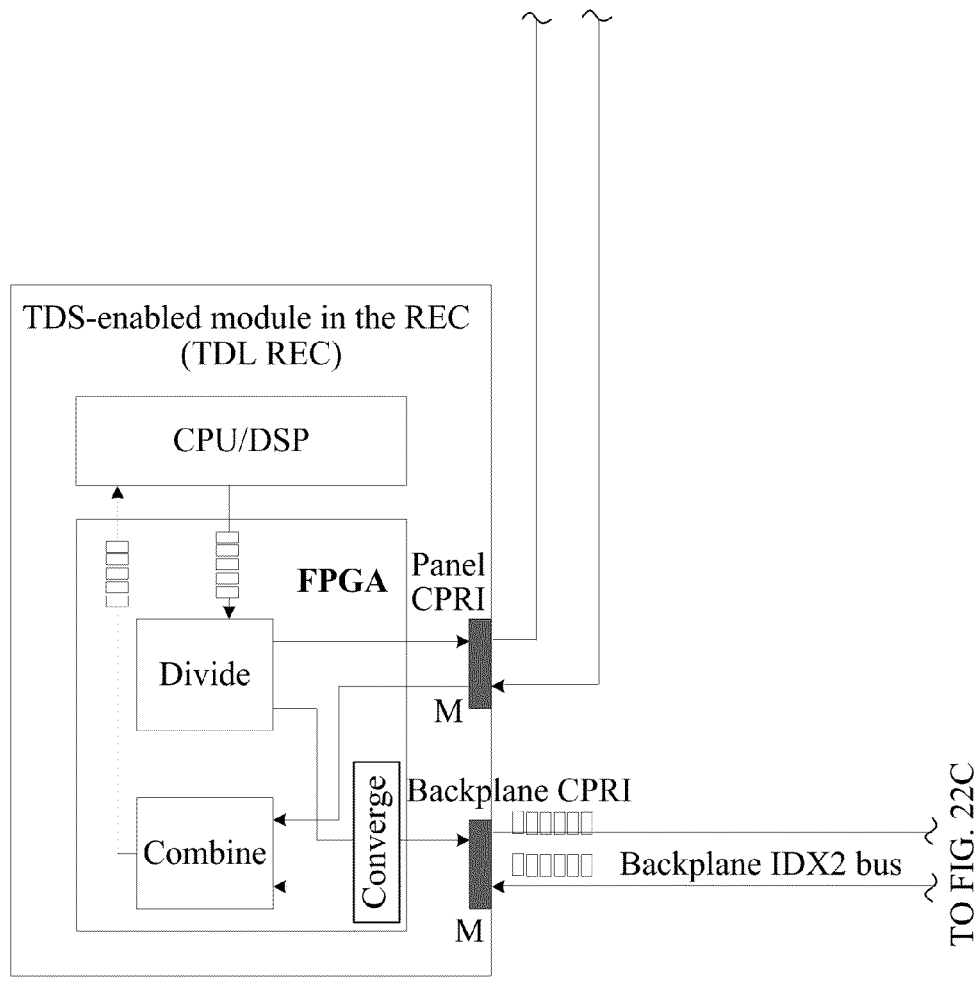
Figure 22C:
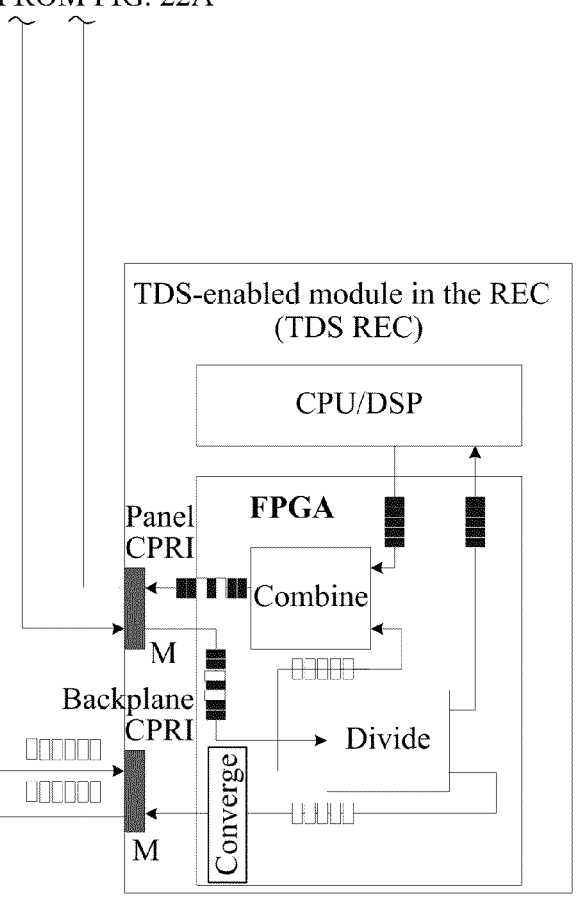

As shown in FIG. 22A, FIG. 22B, and FIG. 22C, two ports of an RE are connected to two ports of a TDL-enabled module. Data transmitted to the RE by the TDL-enabled module needs to be shared by the two ports of the RE, while data transmitted to the RE by the TDS-enabled module does not need to be shared by the two ports of the RE.

For the TDL-enabled module, I/Q data is divided at the granularity of A×C into two panel link directions. One panel link transmits only the data of the TDL-enabled module, and the other panel link needs to perform convergence and combine the data of the TDL-enabled REC with the data of the TDS-enabled module. If the bandwidth of the backplane link of the base station is greater than the bandwidth of the panel link, the convergence function may be implemented on the backplane side.

For the TDS-enabled module, the data is transmitted only on the backplane link; if the bandwidth of the backplane link of the base station is greater than the bandwidth of the panel link, a convergence function may be implemented on the backplane side.

For the RE, the data transmitted to the TDL-enabled module needs to be divided into two paths; one path of data arrives at the TDL-enabled module directly, and the other path of data needs to be combined with the data transmitted to the TDS-enabled module, and then the combined data arrives at the TDL-enabled module through CPRI1. When receiving data, the data transmitted by the TDL-enabled module is received from CPRI1, and the data transmitted by the TDS-enabled module is received from CPRI1. The two parts of data are combined, and then divided. The divided data that needs to be transmitted by the TDL-enabled module is combined with the data received from CPRI0 and transmitted by the TDL-enabled module, and then sent to the IRF.

It can be seen from the foregoing embodiments that, not only the I/Q data but also control data needs to be transmitted between the RE and the REC. In the following, taking HDLC data as an example, the mode of transmitting the control data between the RE and the REC in the embodiments of the present invention is described.

(1) CPRI Data Transmission Mode of a Single-Mode Base Station

Figure 23:
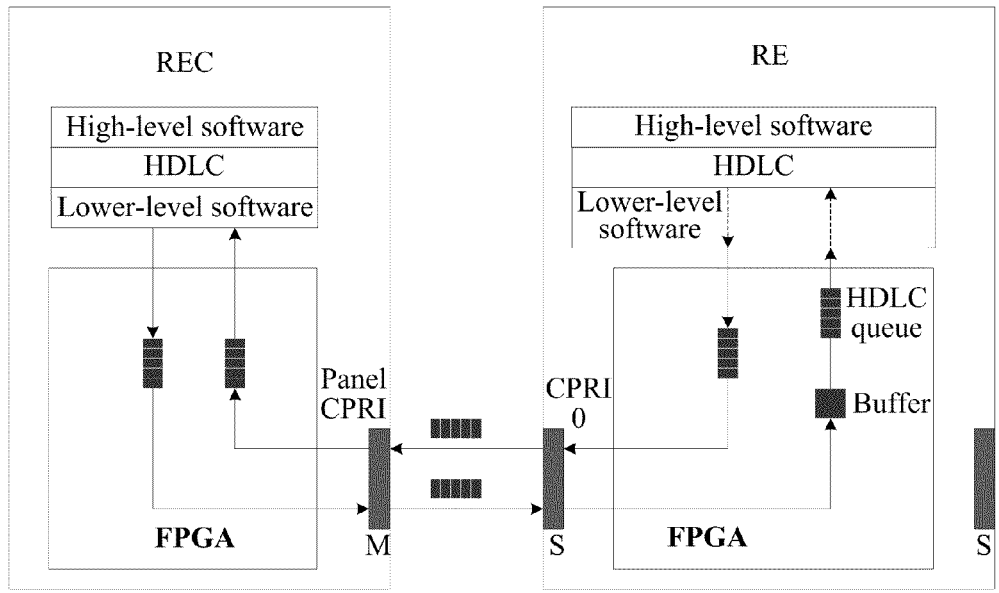
FIG. 23 is a schematic diagram illustrating a mode of transmitting HDLC data from a single-mode base station in a load-sharing mode according to an embodiment of the present invention.

As shown in FIG. 23, HDLC data is transmitted only on one CPRI link. When an RE receives the HDLC data, the FPGA puts the HDLC data into a queue, and the lower-layer software reads the data and sends the data to the high-level software. The other CPRI link serves as a backup link for transmitting the HDLC data.

(2) First Mode of Transmitting CPRI Data of a Dual-Mode Base Station

Figure 24A:
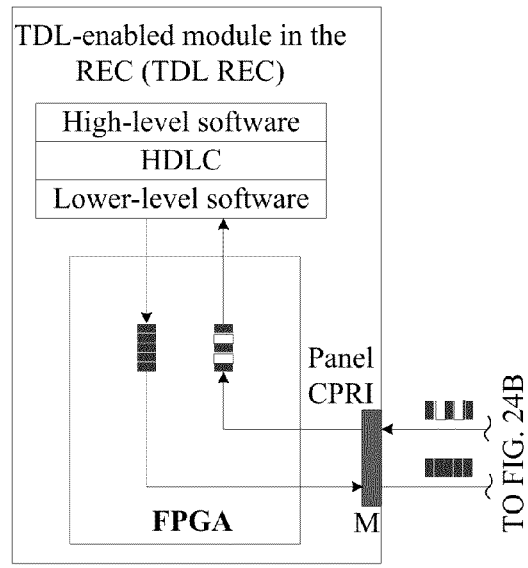
FIG. 24A, FIG. 24B and FIG. 24C are a schematic diagram illustrating a mode of transmitting HDLC data from a dual-mode base station in a load-sharing mode according to an embodiment of the present invention.
Figure 24B:
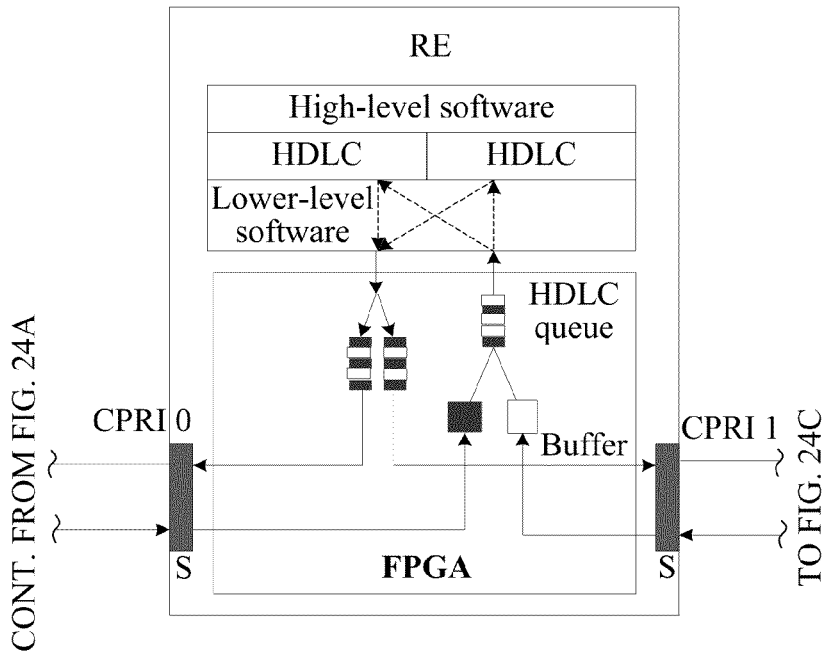
Figure 24C:
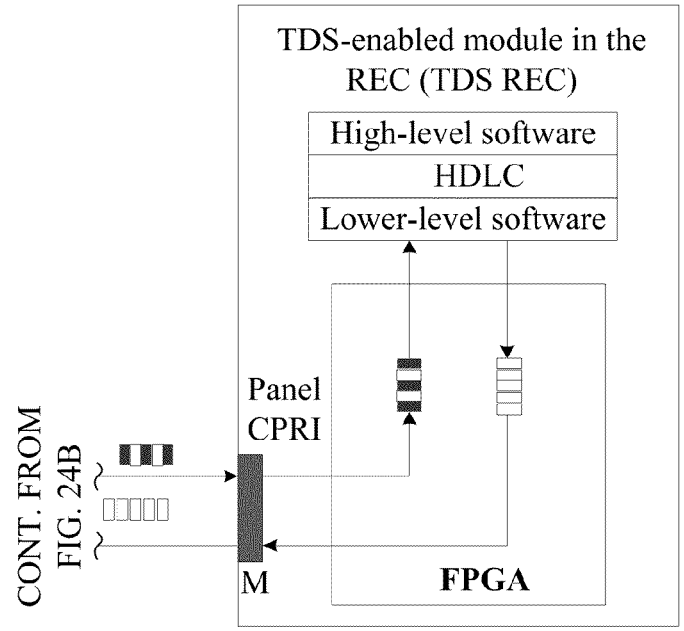

As shown in FIG. 24A, FIG. 24B, and FIG. 24C, two ports of an RE are connected to a port of a TDL-enabled module, and to a port of a TDS-enabled module, respectively. HDLC data of the TDL-enabled module is transmitted over one CPRI link, and HDLC data of the TDS-enabled module is transmitted over the other CPRI link.

When the RE receives the HDLC data, the FPGA puts the HDLC data received from the two ports into a queue, and then sends the data to the high-level software. The HDLC-layer software of the TDL-enabled module and the HDLC-layer software of the TDS-enabled module only retrieve the HDLC data corresponding to their own address according to the address of the HDLC data. When the RE sends the HDLC data, the FPGA combines the HLDC data transmitted to the TDL-enabled module with the HLDC data transmitted to the TDS-enabled module, and sends the combined HDLC data at two ports simultaneously. The HDLC-layer software on the REC side only retrieves the HDLC data corresponding to its own address.

(3) Second Mode of Transmitting CPRI Data of a Dual-Mode Base Station

Figure 25A:
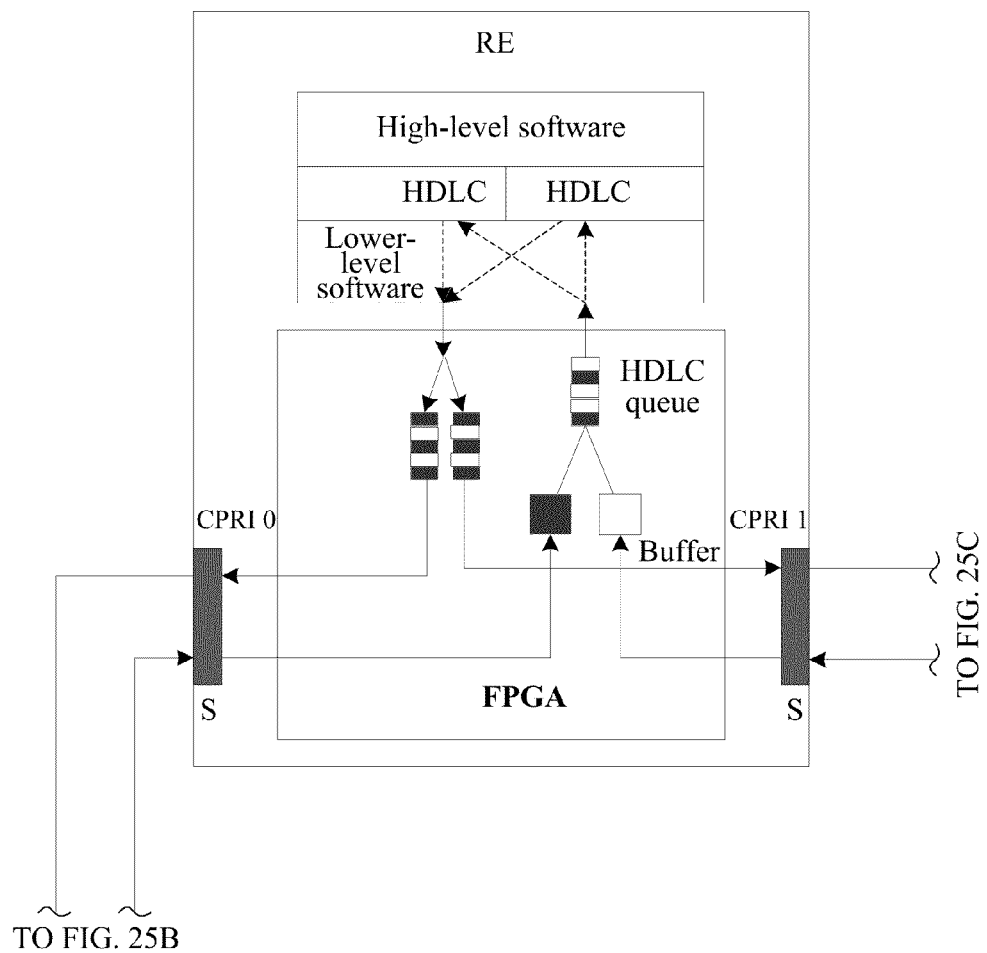
FIG. 25A, FIG. 25B and FIG. 25C are a schematic diagram illustrating another mode of transmitting HDLC data from a dual-mode base station in a load-sharing mode according to an embodiment of the present invention.
Figure 25B:
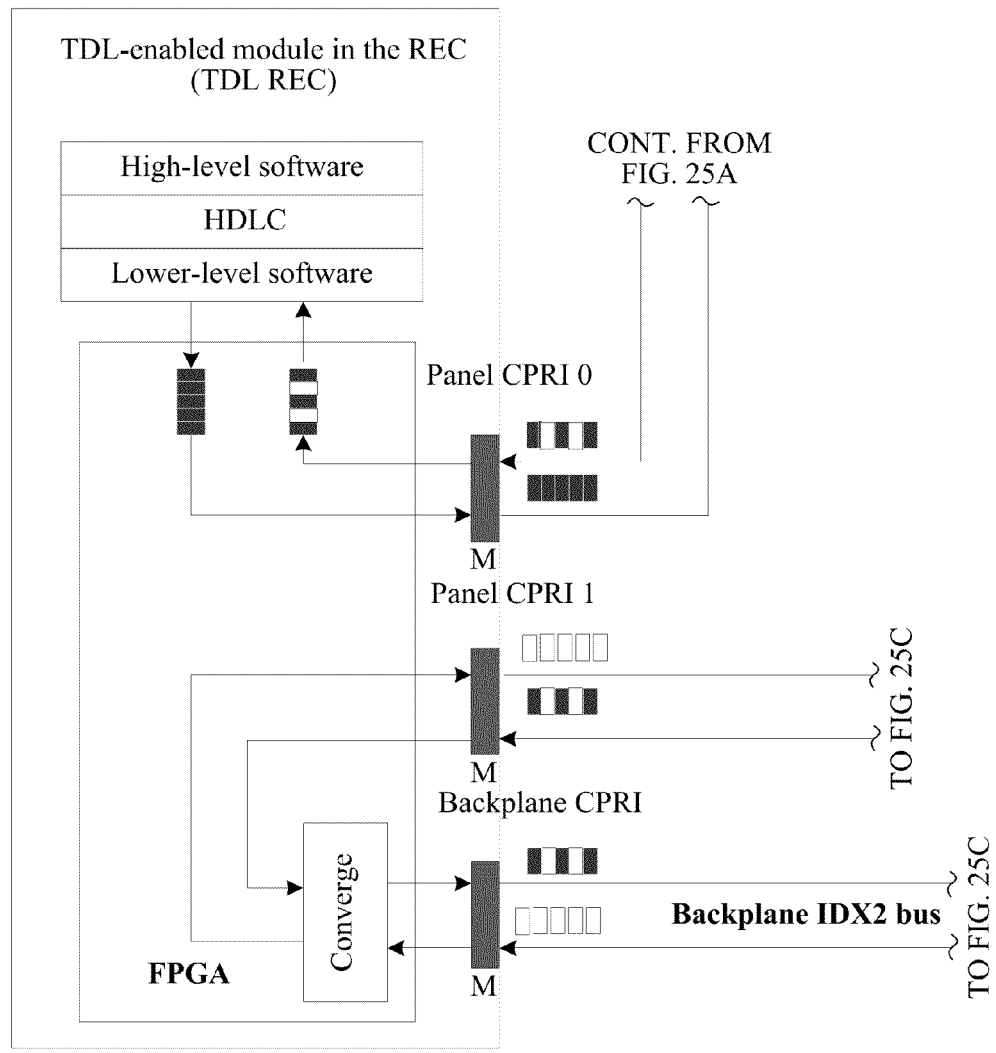
Figure 25C:
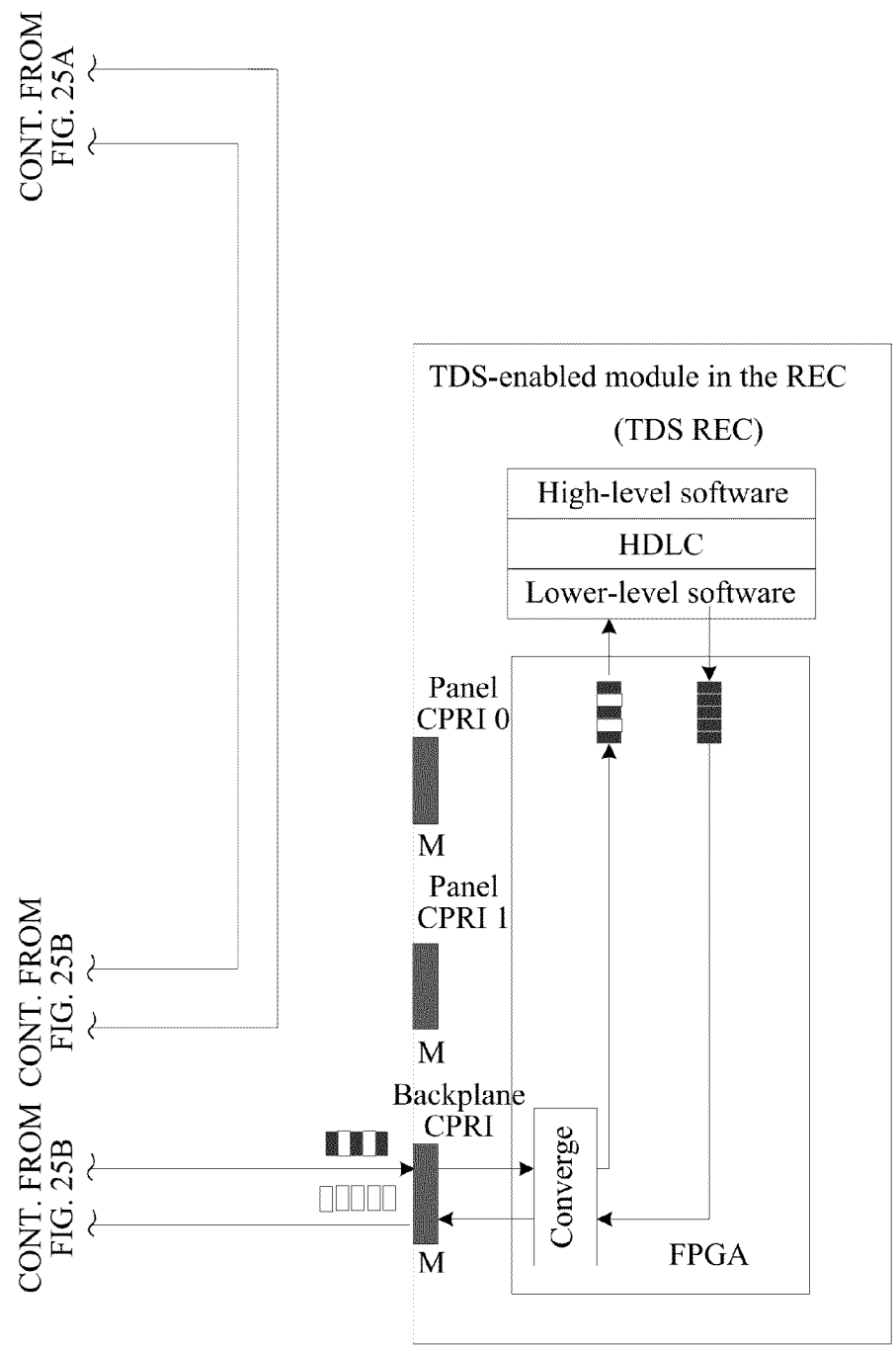

As shown in FIG. 25A, FIG. 25B, and FIG. 25C, two ports of an RE are connected to two ports of a TDL-enabled module. The HDLC data of a TDL-enabled module is transmitted over one CPRI link, and the HDLC data of the TDS-enabled module is transmitted over the other CPRI link.

When the RE receives the HDLC data, the FPGA puts the HDLC data received from the two ports into a queue, and then sends the data to the high-level software. The HDLC-layer software of the TDL-enabled module and the HDLC-layer software of the TDS-enabled module only retrieve the HDLC data corresponding to their own address according to the address of the HDLC data. When the RE sends the HDLC data, the FPGA combines the HLDC data transmitted to the TDL-enabled module with the HLDC data transmitted to the TDS-enabled module, and sends the combined HDLC data at two ports simultaneously. The HDLC-layer software on the REC side retrieves only the HDLC data corresponding to its own address.

The process of transmitting data between two RECs through a backplane link is involved in the embodiments corresponding to FIG. 14-FIG. 17, FIGS. 21A-21C, FIGS. 22A-22C, FIGS. 24A-24C, and FIGS. 25A-25C. The mode of transmitting data through a backplane link is described below.

(1) First Mode of Transmitting CPRI Data of a Dual-Mode Base Station

In this mode, two ports of an RE are connected to a port of a TDL-enabled module, and to a port of a TDS-enabled module, respectively.

If the bandwidth of the backplane link of the base station is greater than the bandwidth of the panel link, the convergence function may be implemented on the backplane side, that is, the data of multiple panel links is converged.

In this case, the data may be transmitted between two modules through the backplane link in two modes.

Figure 26:
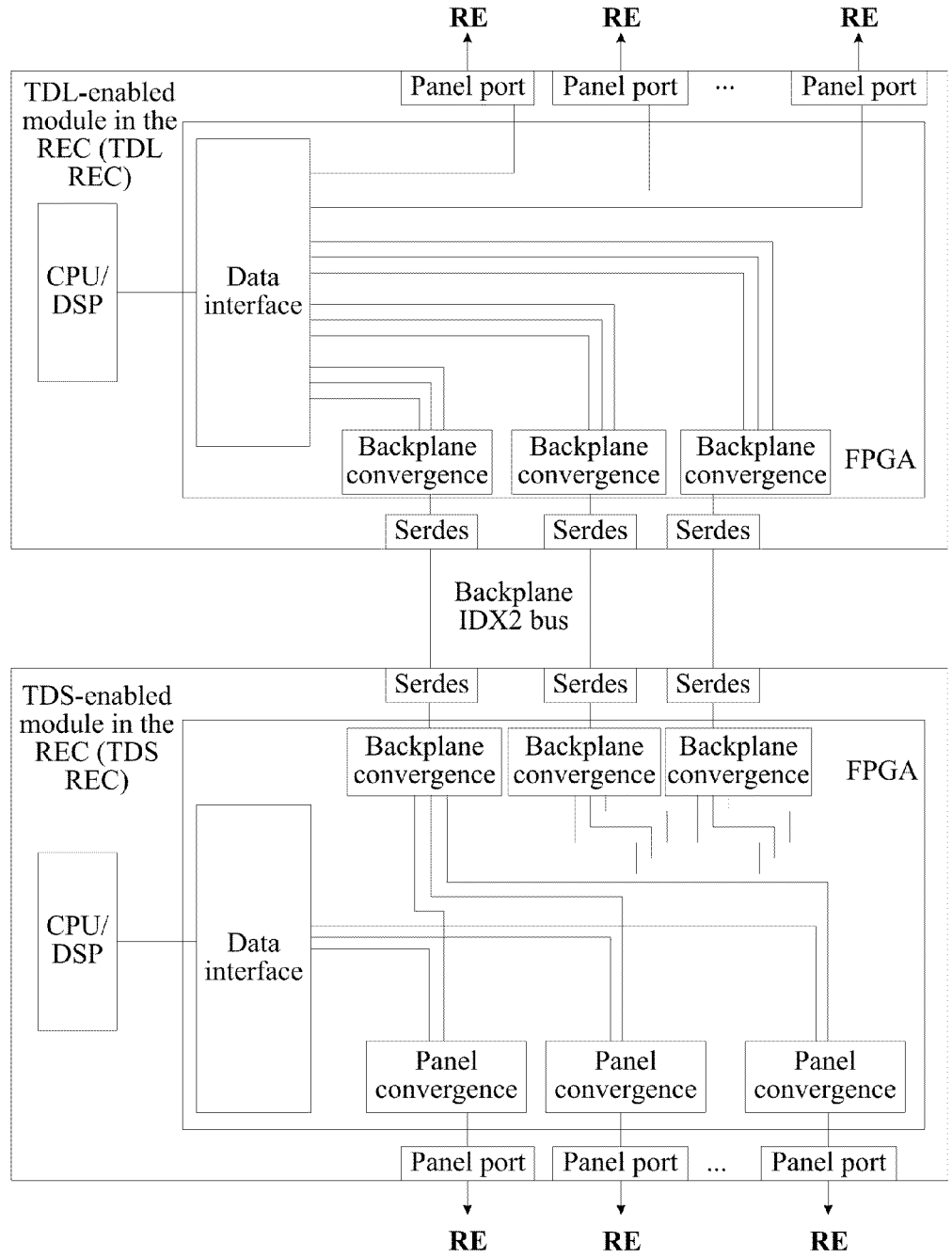
FIG. 26 is a schematic diagram illustrating a mode of transmitting backplane data from a dual-mode base station in a load-sharing mode according to an embodiment of the present invention.

Mode 1: As shown in FIG. 26, the TDS-enabled module implements panel convergence, and needs to converge data on the backplane, where the data is received from multiple panel links and to be transmitted to the TDL-enabled module. Afterward, the converged data is transmitted to the TDL-enabled module. In fact, in this implementation mode, one backplane port corresponds to multiple panel ports.

Figure 27:
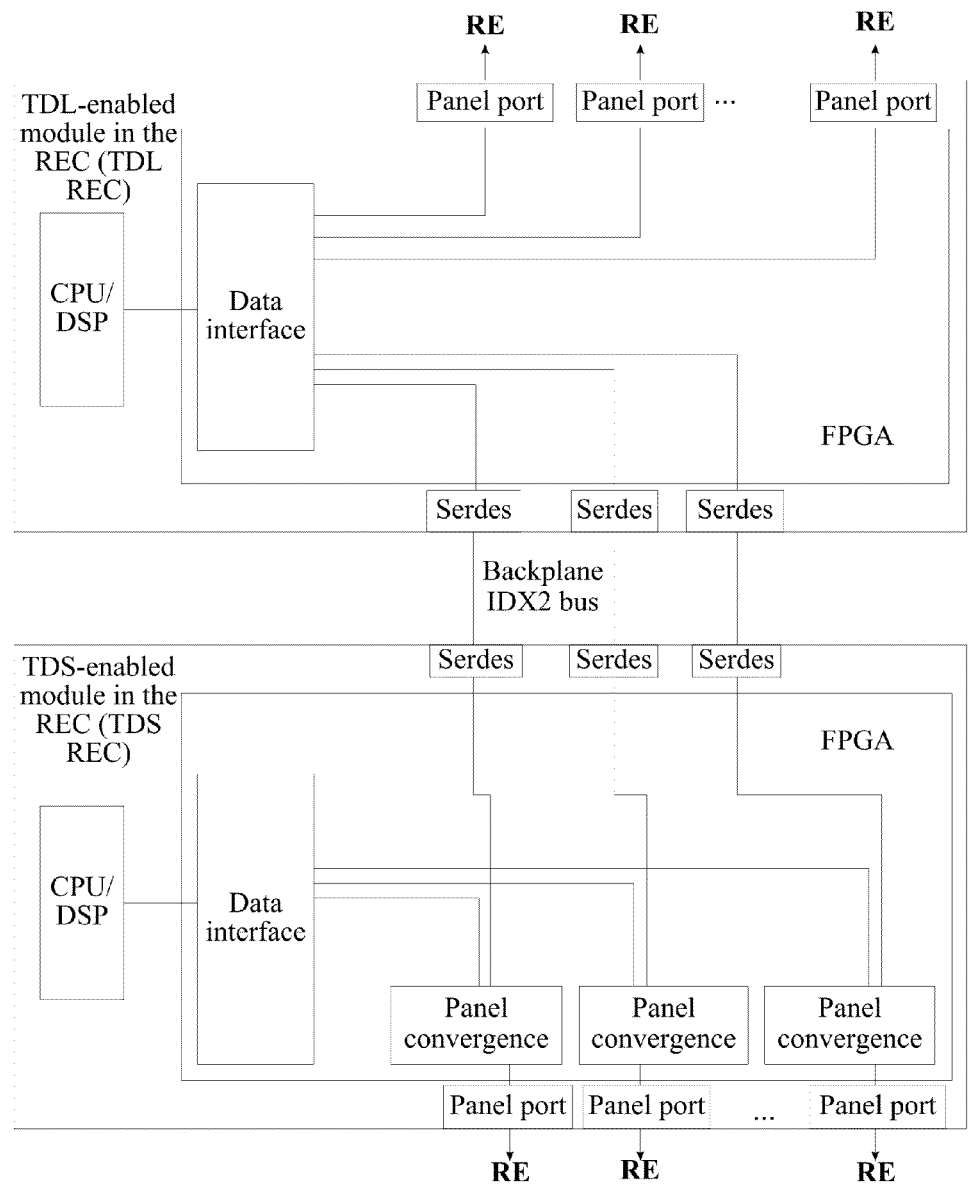
FIG. 27 is a schematic diagram illustrating another mode of transmitting backplane data from a dual-mode base station in a load-sharing mode according to an embodiment of the present invention.

Mode 2: As shown in FIG. 27, the TDS-enabled module implements panel convergence, but does not need to converge data on the backplane, where the data is received from multiple panel links and to be transmitted to the TDL-enabled module. The backplane only needs to forward the data sent by the panel. In fact, in this implementation mode, one backplane port corresponds to one panel port.

Figure 30:
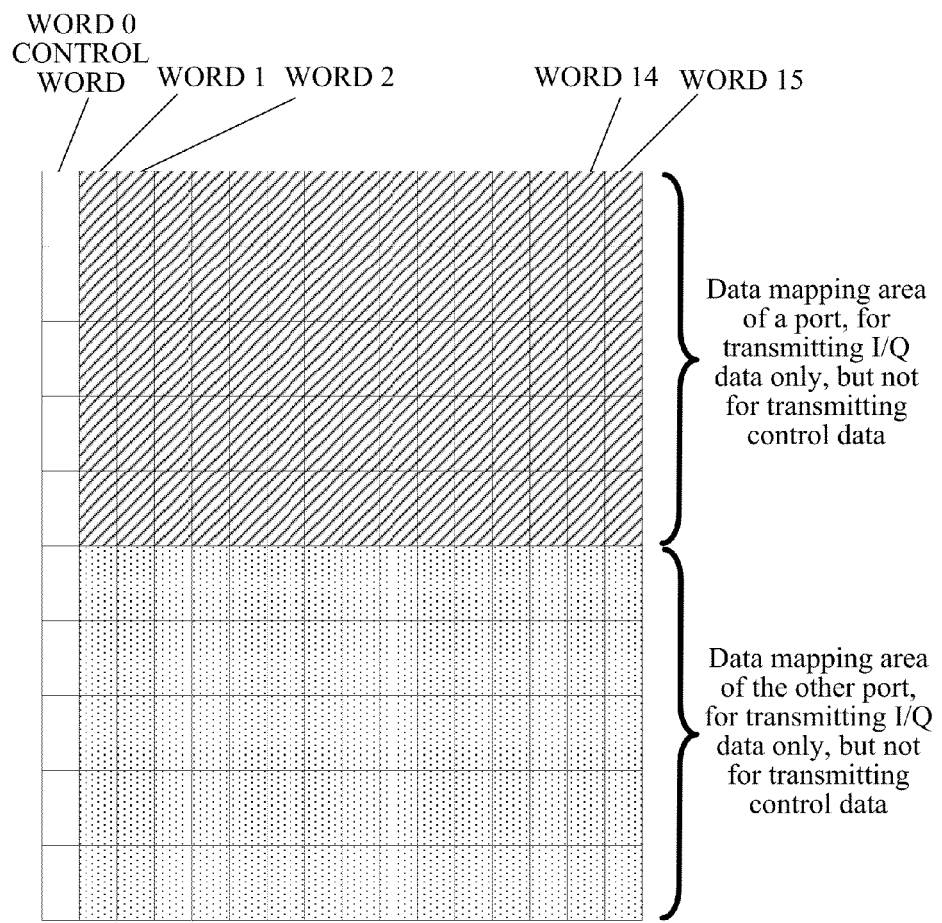
FIG. 30 is a schematic diagram illustrating a transmission format of backplane data from a dual-mode base station in a load-sharing mode according to an embodiment of the present invention.

In the first mode of transmitting CPRI data, the backplane does not need to transmit control data, but only needs to transmit I/Q data. The I/Q data is arranged in many ways, for example, in the way shown in FIG. 30. The data corresponds to different ports depending on the layering mode. As shown in FIG. 30, the bandwidth of each port of the backplane is 6.144 Gbps, and supports transmission of two paths of I/Q data at the rate of 3.072 Gbps; byte 0-byte 4 correspond to one port, and byte 5-byte 9 correspond to the other port.

In the first mode of transmitting CPRI data, in the process of implementing the backplane convergence function and the panel convergence function, the I/Q field is uniformly allocated to the TDL-enabled module and the TDS-enabled module at the shared port, the I/Q fields are not overlapped, and the scheme is easy to implement.

In the first mode of transmitting CPRI data, the line rate of the backplane link is greater than or equal to the integer multiple of the line rate of the panel link.

(2) Second Mode of Transmitting CPRI Data of a Dual-Mode Base Station

In this mode, two ports of the RE are connected to two ports of the TDL-enabled module.

If the bandwidth of the backplane link of the base station is greater than the bandwidth of the panel link, the convergence function may be implemented on the backplane side. The panel of the TDS-enabled module does not need to transmit data.

In this case, the data may be transmitted between two modules through the backplane link in two modes.

Figure 28:
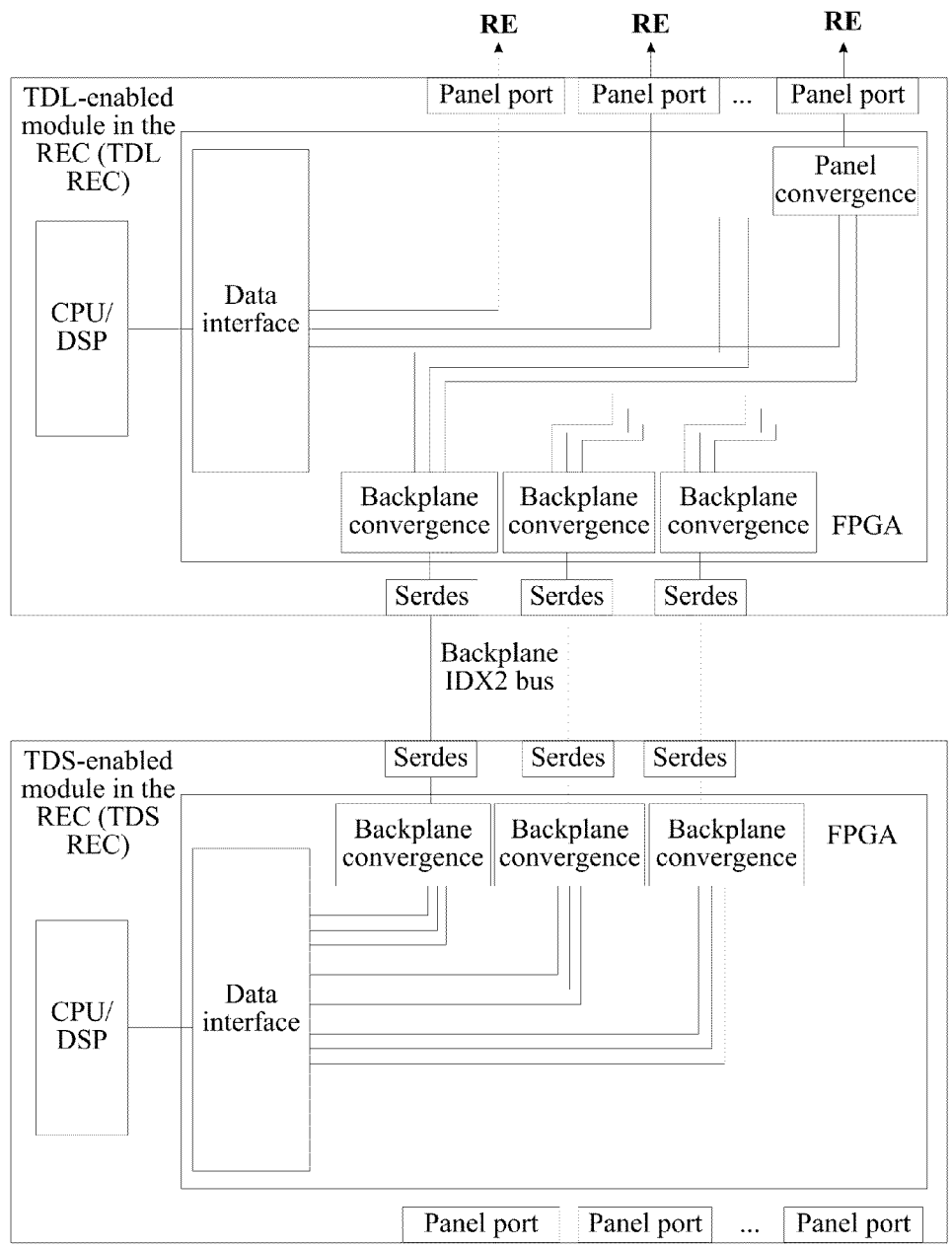
FIG. 28 is a schematic diagram illustrating another mode of transmitting backplane data from a dual-mode base station in a load-sharing mode according to an embodiment of the present invention.

Mode 1: As shown in FIG. 28, the TDL-enabled module implements panel convergence, and needs to converge data on the backplane, where the data is received from multiple panel links and to be transmitted to the TDS-enabled module. Afterward, the converged data is transmitted to the TDS-enabled module. In fact, in this implementation mode, one backplane port corresponds to multiple panel ports.

Figure 29:
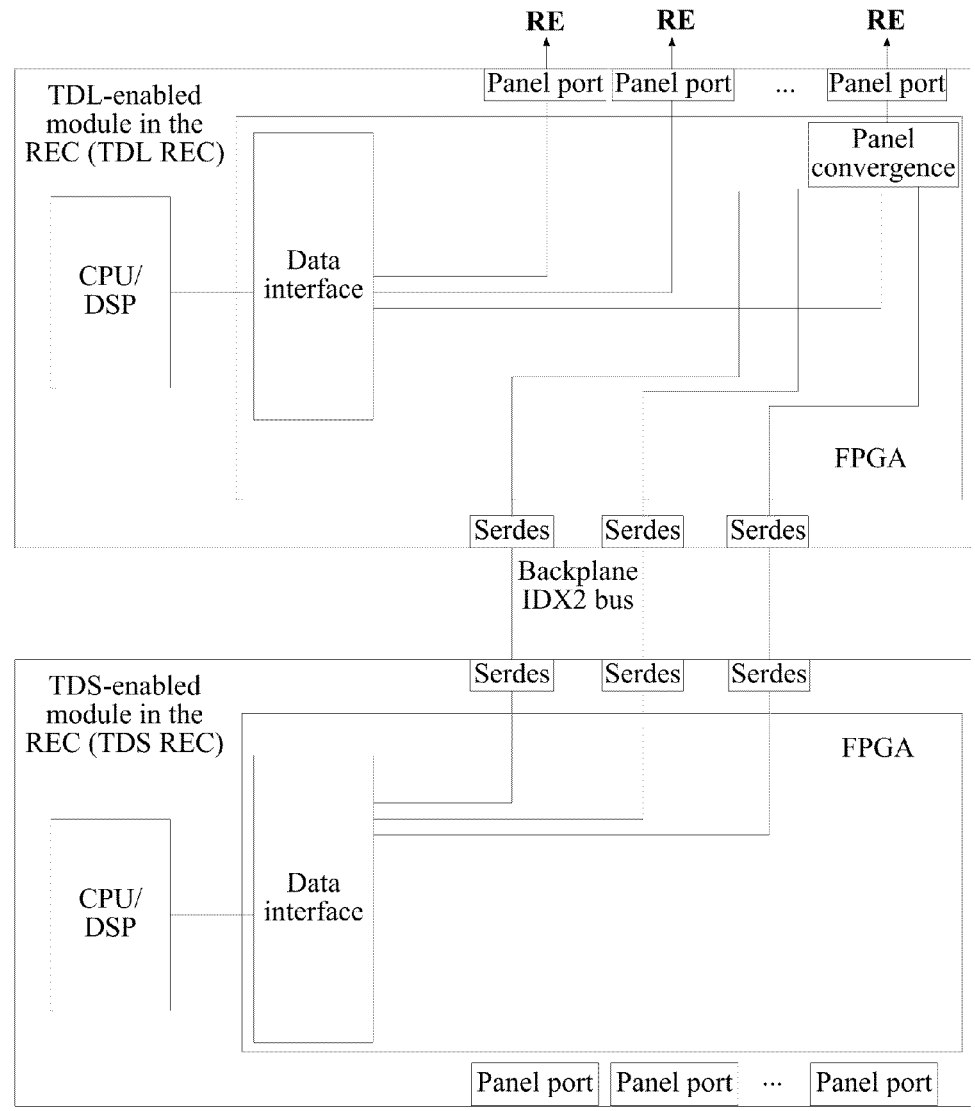
FIG. 29 is a schematic diagram illustrating another mode of transmitting backplane data from a dual-mode base station in a load-sharing mode according to an embodiment of the present invention.

Mode 2: As shown in FIG. 29, the TDL-enabled module implements panel convergence, but does not need to converge data on the backplane, where the data is received from multiple panel links and to be transmitted to the TDS-enabled module. The backplane needs only to forward the data sent by the panel. In fact, in this implementation mode, one backplane port corresponds to one panel port.

Figure 31:
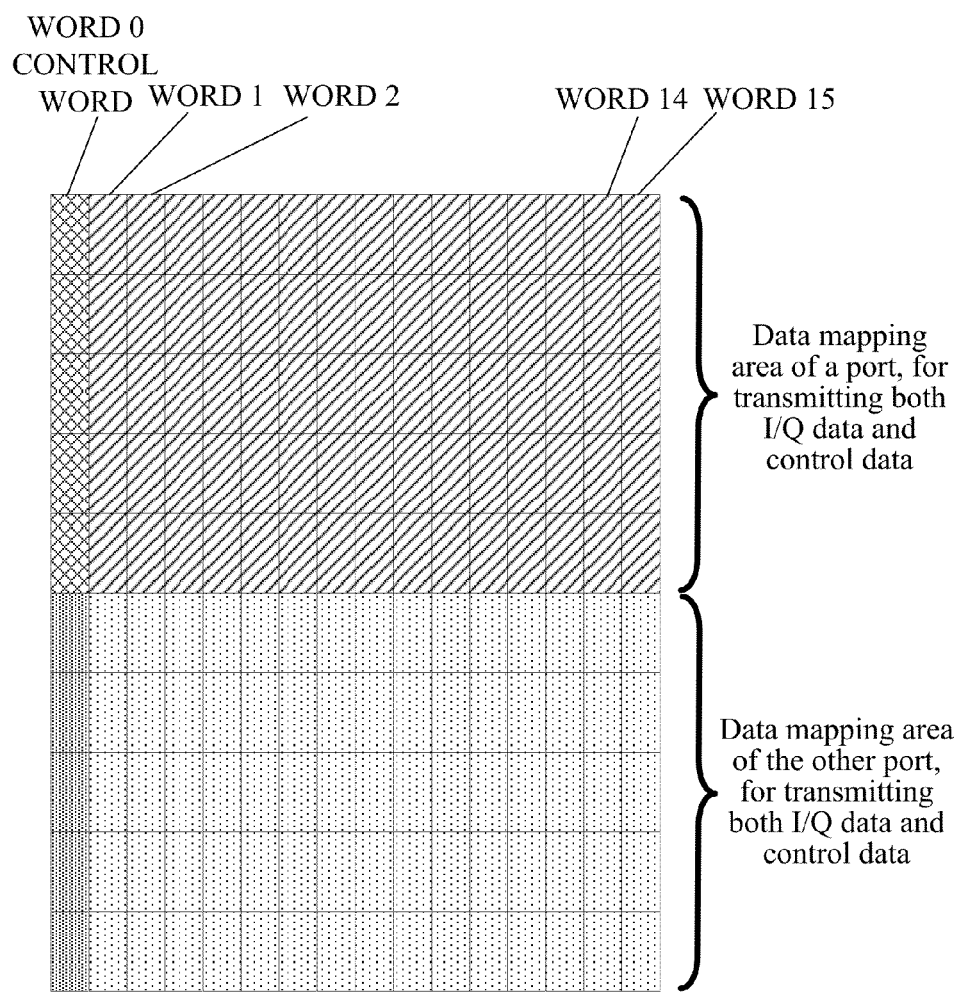
FIG. 31 is a schematic diagram illustrating another transmission format of backplane data from a dual-mode base station in a load-sharing mode according to an embodiment of the present invention.

In the second mode of transmitting CPRI data, the backplane needs to transmit control data and I/Q data. The I/Q data is arranged in many ways, for example, in the way shown in FIG. 31. The data corresponds to different ports depending on the layering mode. As shown in FIG. 31, the bandwidth of each port of the backplane is 6.144 Gbps, and supports transmission of two paths of I/Q data at the rate of 3.072 Gbps; byte 0-byte 4 correspond to one port, and byte 5-byte 9 correspond to the other port. It should be noted that the rate here is only an example intended for helping persons of ordinary skill in the art understand the embodiments of the present invention better. Other applicable rates are not set out here exhaustively. For example, if the backplane rate is 6.144 Gbps, the bandwidth supports transmission of four paths of data at the rate of 1.2288 Gbps.

In the second mode of transmitting CPRI data, in the process of implementing the backplane convergence function and the panel convergence function, the I/Q field is uniformly allocated to the TDL-enabled module and the TDS-enabled module at the shared port, and the I/Q fields are not overlapped. The control data is also in a one-to-one mapping relation. The scheme is easy to implement.

In the second mode of transmitting CPRI data, the line rate of the backplane link is greater than or equal to the integer multiple of the line rate of the panel link.

Figure 32:
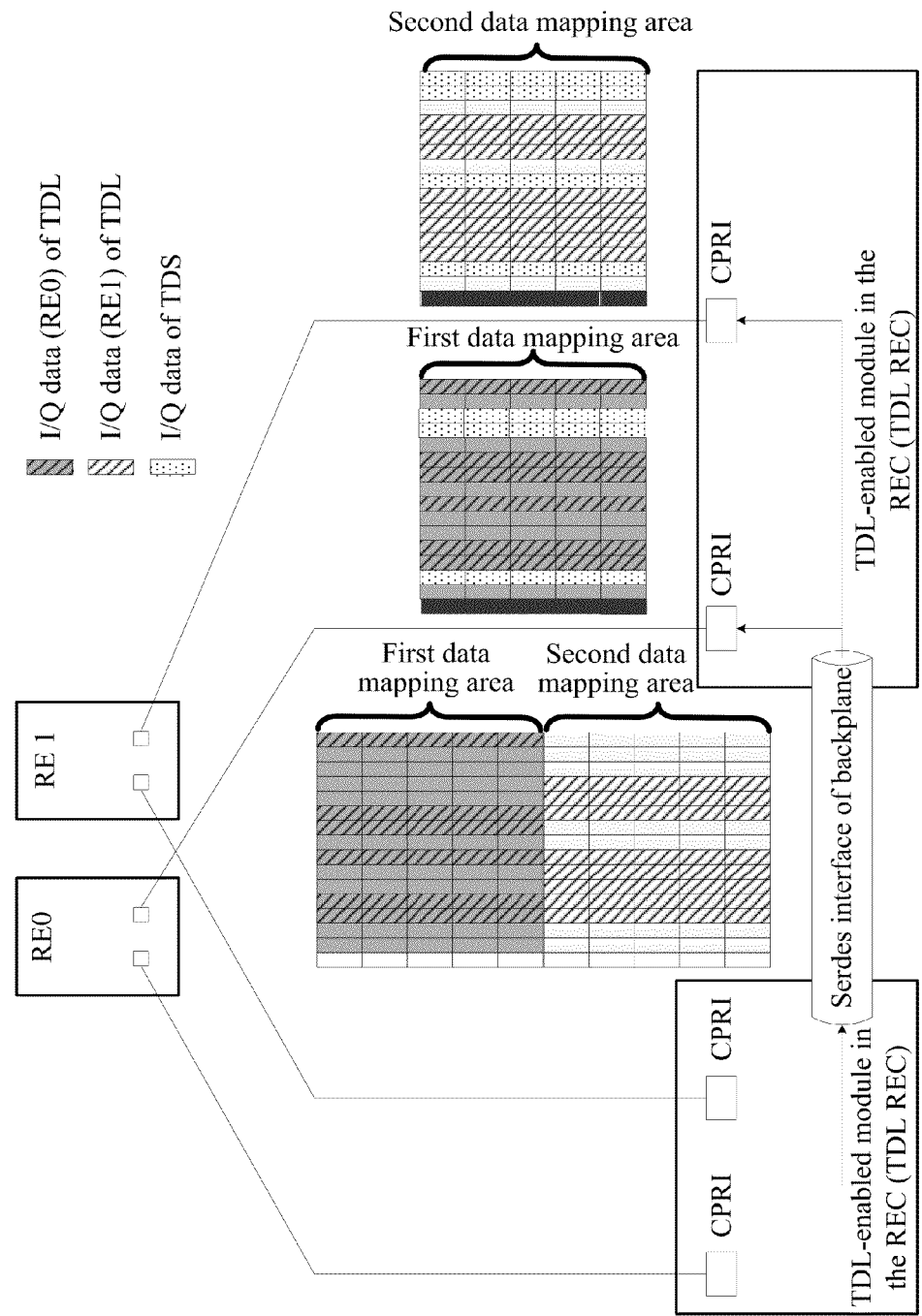
FIG. 32 is a schematic diagram illustrating how an I/Q allocation policy is shared by a dual-mode base station in a load-sharing mode according to an embodiment of the present invention.

In practice, when the RECs that support two different modes transmit I/Q data on the same CPRI link, the RECs that support the two modes need to work in cooperation. In the basic frame of CPRI, a suitable space is allocated to the I/Q data of the RECs that support the two modes to avoid overlapped space allocated to the data of the RECs that support the two modes in the basic frame of CPRI. In FIG. 32, the bandwidth of each backplane link is 6.144 Gbps, which supports transmission of two paths of I/Q data at the rate of 3.072 Gbps; after receiving the CPRI basic frame from the TDL-enabled module through the backplane, the TDS-enabled module needs to allocate space to the data that needs to be transmitted to the RE in the CPRI basic frame. The space occupied by the data of the TDS-enabled module in the CPRI basic frame is not overlapped with the space occupied by the data of the TDL-enabled module in the CPRI basic frame.

The implementation of the embodiments of the present invention needs to be supported not only by hardware technologies, but also by software technologies. Especially, the REC and the RE need to be configured before I/Q data transmission. Accordingly, an embodiment of the present invention provides a software configuration process required for implementing the embodiments of the present invention.

Figure 33A:
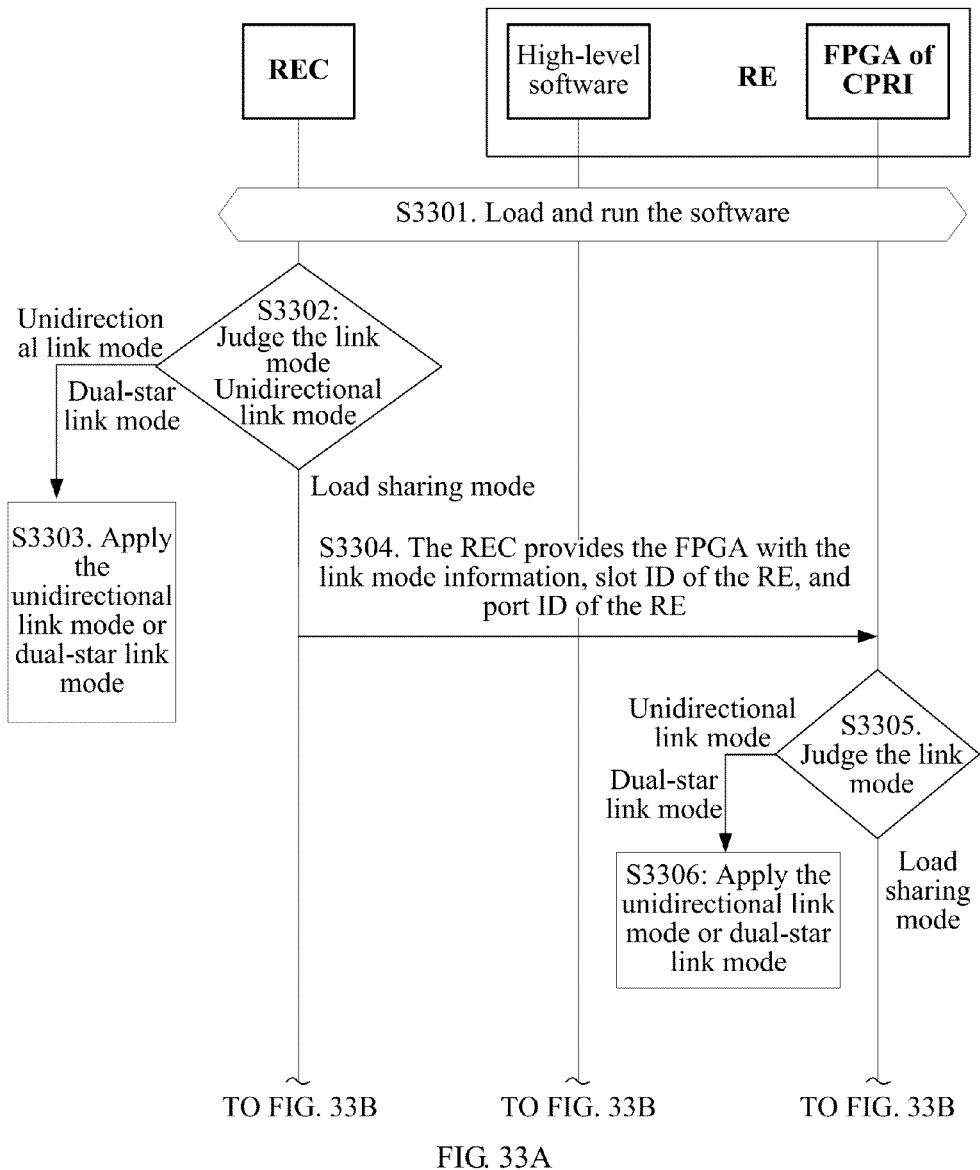
FIG. 33A and FIG. 33B are a diagram illustrating a software configuration process according to an embodiment of the present invention.
Figure 33B:
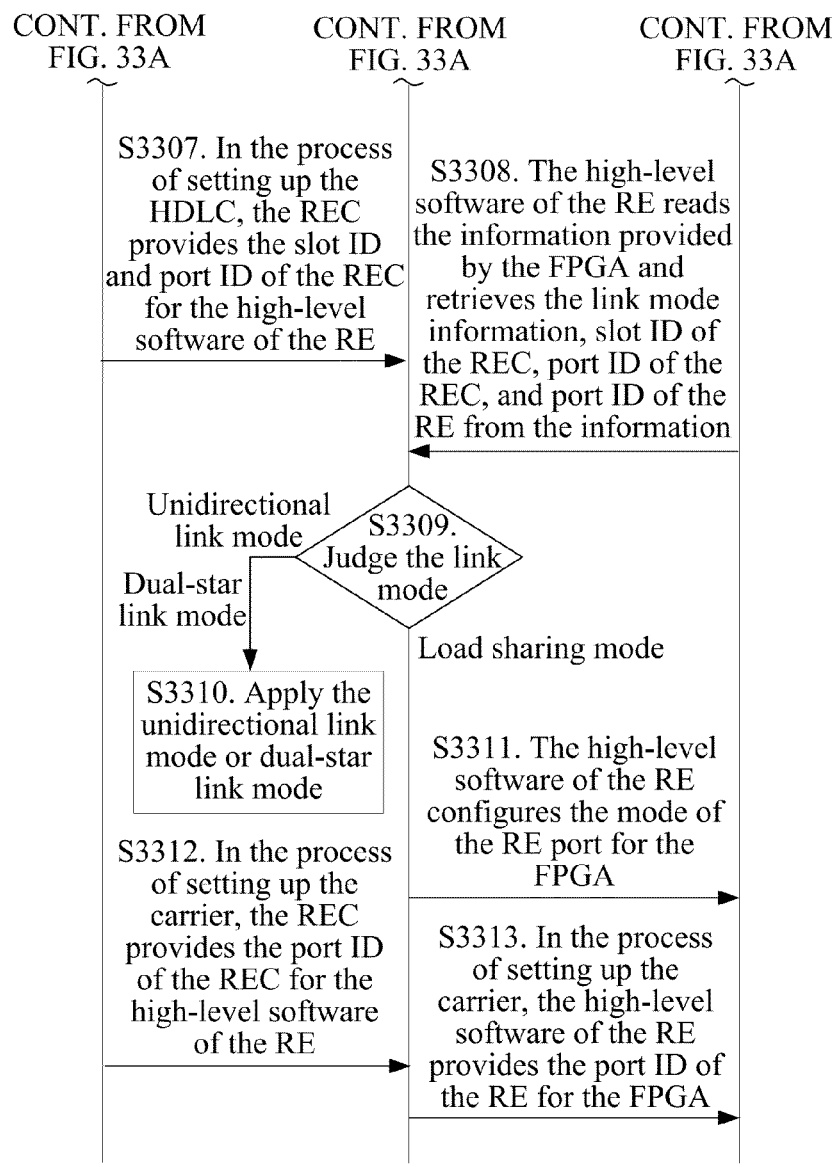

As shown in FIG. 33, the software configuration process includes the following steps.

S3301: The FPGA loads and runs the software.

S3302: The FPGA judges the CPRI link mode, and the process proceeds to S3303 if the CPRI link mode is a unidirectional link mode or dual-star link mode, or the process proceeds to S3304 if the CPRI link mode is a load sharing mode (that is, multiple CPRI links are used for transmitting I/Q data).

S3303: Apply the unidirectional link mode or dual-star link mode.

S3304: An REC provides the FPGA with the link mode information, Slot ID of an RE, and Port ID of the RE.

S3305: The FPGA judges the link mode, and the process proceeds to S3306 if the link mode is a unidirectional link mode or dual-star link mode, or the process proceeds to S3308 if the link mode is a load sharing mode (that is, multiple CPRI links are used for transmitting I/Q data).

S3306: Apply the unidirectional link mode or dual-star link mode.

S3308: The high-level software of the RE reads the information provided by the FPGA and retrieves the link mode information, Slot ID of the REC, Port ID of the REC, and Port ID of the RE from the information, and the process proceeds to S3309.

After S3304 and before S3308, the software configuration process further includes the following steps.

S3307: In the process of setting up the HDLC, the REC provides the Slot ID and Port ID of the REC for the high-level software of the RE.

S3309: The high-level software of the RE judges the link mode, and the process proceeds to S3310 if the link mode is a unidirectional link mode or dual-star link mode, or the process proceeds to S3311 if the link mode is a load sharing mode (that is, multiple CPRI links are used for transmitting I/Q data).

S3310: Apply the unidirectional link mode or dual-star link mode.

S3311: The high-level software of the RE configures the mode of the RE port for the FPGA.

S3312: In the process of setting up the carrier, the REC provides the Port ID of the REC for the high-level software of the RE.

S3313: In the process of setting up the carrier, the high-level software of the RE provides the Port ID of the RE for the FPGA.

The message interface for setting up a carrier between the REC and the high-level software of the RE includes, but is not limited to, the information shown in FIG. 7.

TABLE 7

| Field | Length (byte) | Parameter type | Description |
|---|---|---|---|
| Command ID | 1 | 0x7E | Request |
| High byte of length | 1 | Variable length | Length; 2 bytes |
| Low byte of length | 1 | Variable length | |
| Transaction ID | 2 | INTEGER (0 ... 2^16−1) | Transaction ID |
| ... | | | |
| Type Length Value (TLV) Type | 1 | INTEGER (1) | TLV Type: Receiving (RX) information |
| TLV Length | 2 | INTEGER (0 ... 2^16−1) | TLV Length |
| TLV Value | | | TLV Value |
| ... | | | |
| >Index of Carrier | 1 | INTEGER (0 ... MAX_RX_CARRIER_PER_CHANNEL−1) | Index of Carrier |
| ... | | | |
| >Amount of AxC | 1 | INTEGER (0 ... 0xFF) | The total AxC of this carrier in RX direction |
| >AxC Location Information | 0 ... <Amount of AxC>(amount of AxC) | | |
| >>AxC Index | 1 | INTEGER (0 ... 0xFF) | AxC Index. 0xFF: Invalid |
| >>Start Bit | 2 | INTEGER (0 ... 2^16) | The start Bit of this AxC. |
| >>Bit Length | 2 | INTEGER (0 ... 2^16) | The bit length of this AxC. |
| >>Sub Rack ID of REC | 1 | INTEGER (0 ... 0xFF) | Sub Rack ID of REC 0xFF: Invalid |
| >>Slot ID of REC | 1 | INTEGER (0 ... 0xFF) | Slot ID of REC 0xFF: Invalid |
| >>CPRI Port ID of REC | 1 | INTEGER (0 ... 0xFF) | CPRI Port ID of REC. 0xFF: Invalid |
| ... | | | |
| TLV Type | 1 | INTEGER (1) | TLV Type: TX Information |
| TLV Length | 2 | INTEGER (0 ... 2^16−1) | TLV Length |
| TLV Value | | | TLV Value |
| ... | | | |
| >Index of Carrier | 1 | INTEGER (0 ... MAX_TX_CARRIER_PER_CHANNEL−1) | Index of Carrier |
| ... | | | |
| >Amount AxC | 1 | INTEGER (0 ... 0xFF) | The total AxC of this carrier in TX direction |
| >AxC Location Information | 0 ... <Amount of AxC> | | |
| >>AxC Index | 1 | INTEGER (0 ... 0xFF) | AxC Index. 0xFF: Invalid |
| >>Start Bit | 2 | INTEGER (0 ... 2^16) | The start Bit of this AxC. |
| >>Bit Length | 2 | INTEGER (0 ... 2^16) | The bit length of this AxC. |
| >>Sub Rack ID of REC | 1 | INTEGER (0 ... 0xFF) | Sub Rack ID of REC 0xFF: Invalid |
| >>Slot ID of REC | 1 | INTEGER (0 ... 0xFF) | Slot ID of REC 0xFF: Invalid |
| >>CPRI Port ID of REC | 1 | INTEGER (0 ... 0xFF) | CPRI Port ID of REC. 0xFF: Invalid |
| ... | | | |

The message interface for setting up a carrier includes the length of the uplink and downlink AxC of the carrier, start bit, and Port ID. The RE can determine the RE port corresponding to the AxC according to the Port ID of the REC. For each AxC, the I/Q data is transmitted on a specified port so that the I/Q data is distributed onto different CPRI links for transmission.

The specific bit location of the AxC in the basic frame of the CPRI is obtained through calculation by the REC according to the CPRI line rate. The CPRI line rate determines the number of bits in each control data.

It should be noted that if multiple CPRI links are used for transmitting the I/Q data between the REC and the RE, more I/Q data can be transmitted between the REC and the RE at the same hardware cost. Taking a TDL base station as an example, Table 8 shows CPRI bandwidth required for transmitting I/Q data based on the prior art and based on the present invention respectively.

TABLE 8

| Scenario | RF specification (TD-LTE) | CPRI bandwidth required in the prior art | CPRI bandwidth required in load sharing mode |
|---|---|---|---|
| 1 | 10M(8T8R) | 4.9152G | 2.4576G × 2 |
| 2 | 10M(8T8R) | 4.9152G | 2.4576G × 2 |
| 3 | 20M(8T8R) | 9.8304G | 6.144G × 2 |
| 4 | 20M(8T8R) | 9.8304G | 6.144G × 2 |

In Table 8, 10M refers to the width of the radio band occupied by the TDL base station, and 8T8R means that the TDL base station employs 8 TX antennas and 8 RX antennas.

From the perspective of hardware, the devices that support high rates (such as optical module and logical device) are expensive, and the devices that support low rates are cheap. Therefore, it can be seen from Table 8, the technical solutions of the embodiments of the present invention lowers the requirements on the CPRI bandwidth and hardware, and reduces the hardware cost.

As for the multi-mode base station, the CPRI link with sufficient bandwidth may undertake transmission of I/Q data of the REC that supports multiple modes, especially the data of the REC with a great amount of data. In this way, hardware resources can be made full use of, and the base station cost can be reduced. For example, for a multi-mode base station that supports TDS and TDL, when the Radio Frequency (RF) units share the same mode, the CPRIs of the two modes require different bandwidth. The CPRI of the TDL mode requires greater bandwidth, and the CPRI of the TDS mode requires less bandwidth. The application of the embodiments of the present invention lowers the requirement on hardware.

TABLE 9

| Scenario | RF specification (TDL TDS) | CPRI bandwidth required in the prior art | CPRI bandwidth required in the present invention |
|---|---|---|---|
| 1 | 10M(8T8R) + 3C | 4.9152G + 1.2288G | 3.072G × 2 |
| 2 | 10M(8T8R) + 6C | 4.9152G + 2.4576G | 3.6864G × 2 |
| 3 | 20M(8T8R) + 3C | 9.8304G + 1.2288G | 6.144G × 2 |
| 4 | 20M(8T8R) + 6C | 9.8304G + 2.4576G | 6.144G × 2 |

In Table 9, 3C refers to 3 carriers of the TDS.

It should be noted that the embodiments of the present invention are applicable to single-mode base stations of various radio modes such as GSM, UMTS, Code Division Multiple Access (CDMA), Worldwide Interoperability for Microwave Access (WiMAX), Long Term Evolution (LTE), and TDS, and are applicable to multi-mode base stations that support a combination of different modes, such as a dual-mode base station that supports a combination of GSM and UMTS, a dual-mode base station that supports a combination of UMTS and CDMA, and a dual-mode base station that supports a combination of UMTS and LTE.

It should be noted that in the embodiments of the present invention, the values of the parameters such as Slot ID and Port ID are configurable by persons of ordinary skill in the art according to actual requirements.

It should be noted that, although the foregoing embodiments suppose that only two CPRI links exist between the REC and the RE, persons of ordinary skill in the art may set more than two CPRI links between the REC and the RE at their discretion in practice. In this case, the data that needs to be transmitted between the REC and the RE in a divided manner may be transmitted over more than two CPRI links.

The embodiments of the present invention are not only applicable to distributed base stations, but also applicable to macro base stations. In a word, the embodiments of the present invention are applicable to any base stations on which the BBU is interconnected with the RF unit through a CPRI.

Persons of ordinary skill in the art should understand that all or part of the steps of the method according to the embodiments above may be implemented by a program instructing relevant hardware. The program may be stored in computer readable storage media. When the program runs, the program executes the steps of the method specified in the embodiments. The storage media may be a magnetic disk, CD-ROM, Read-Only Memory (ROM), or Random Access Memory (RAM).

Preferred embodiments of the present invention are described. It should be noted that, persons of ordinary skill in the art can make modifications and variations without departing from the principle of the present invention, which should be construed as falling within the scope of the present invention.

What is claimed is:

1. A method for transmitting Common Public Radio Interface (CPRI) data in a radio base station over CPRI links between a Radio Equipment Control (REC) and a Radio Equipment (RE), the method comprising:

dividing, a single in-phase/quadrature phase (I/Q) data stream into multiple paths of I/Q data each of which carrying different content of the single I/Q data stream, wherein the REC and the RE serve as peer ends to one another, and wherein the multiple paths of I/Q data include at least a first path of I/Q data and a second path of I/Q data, the first path of I/Q data having different content than the second path of I/Q data; and transmitting, by a first one of the peer ends, the multiple paths of I/Q data to a second one of the peer ends over at least two CPRI links, wherein each path in the multiple paths of I/Q data is transmitted over a different one of the at least two CPRI links, wherein the REC supports multiple modes, wherein the at least two CPRI links include a first CPRI link extending between the RE and a first module supporting a first mode in the REC, and a second CPRI link extending between the RE and a second module supporting a second mode in the REC, the second mode being different than the first mode, and wherein a data link extends between the first module and the second module, and wherein transmitting the multiple paths of I/Q data to the second peer end over the at least two CPRI links comprises transmitting, by the RE, the first path of I/Q data to the first module in the REC over the first CPRI link, and transmitting the second path of I/Q data to the second module, wherein the second module transmits the second path of I/Q data to the first module over the data link.

2. The method according to claim 1, wherein the multiple paths of I/Q data include at least a first path of I/Q data and a second path of I/Q data, the first path of I/Q data having different content than the second path of I/Q data, and
wherein transmitting the multiple paths of I/Q data to the second peer end over the at least two CPRI links comprises transmitting the first path of I/Q data over the first CPRI link, and transmitting the second path of I/Q data over the second CPRI link.

3. The method of claim 1, wherein the first mode is a Global System for Mobile Communications (GSM) mode, and wherein the second mode is a Universal Mobile Telecommunications System (UMTS) mode.

4. A method for transmitting Common Public Radio Interface (CPRI) data in a radio base station over CPRI links between a Radio Equipment Control (REC) and a Radio Equipment (RE), the method comprising:
dividing, a single in-phase/quadrature phase (I/Q) data stream into multiple paths of I/Q data each of which carrying different content of the single I/Q data stream, wherein the REC and the RE serve as peer ends to one another, wherein the multiple paths of I/Q data include at least a first path of I/Q data and a second path of I/Q data, the first path of I/Q data having different content than the second path of I/Q data; and
transmitting, by a first one of the peer ends, the multiple paths of I/Q data to a second one of the peer ends over at least two CPRI links, wherein each path in the multiple paths of I/Q data is transmitted over a different one of the at least two CPRI links, wherein the REC supports multiple modes, wherein the at least two CPRI links include a first CPRI link extending between the RE and a first module supporting a first mode in the REC, and a second CPRI link extending between the RE and a second module supporting a second mode in the REC, the second mode being different than the first mode, and wherein a data link extends between the first module and the second module, and
wherein transmitting the multiple paths of I/Q data to the second peer end over the at least two CPRI links comprises transmitting, by the RE, the first path of I/Q data to the first module over the first CPRI link, and transmitting the second path of I/Q data to the second module over the second CPRI link.

5. A method for processing Common Public Radio Interface (CPRI) data in a radio base station over CPRI links between a Radio Equipment Control (REC) and a Radio Equipment (RE), the method comprising:
receiving, multiple paths of in-phase/quadrature phase (I/Q) data over at least two CPRI links, wherein the REC and the RE serve as peer ends of each other, and wherein the multiple paths of I/Q data are communicated from a first one of the peer ends to a second one of the peer ends; and
combining, by the second peer end, the multiple paths of I/Q data into a single I/Q data stream, wherein each of the multiple paths of I/Q data carries different content of the single I/Q data stream,
wherein the REC supports multiple modes,
wherein the at least two CPRI links include a first CPRI link extending between the RE and a first module supporting a first mode in the REC, and a second CPRI link extending between the RE and a second module supporting a second mode in the REC, the second mode being different than the first mode, and
wherein a data link extends between the first module and the second module.

6. The method according to claim 5,
wherein receiving the multiple paths of I/Q data comprises receiving two paths of I/Q data with different content from the first peer end over the at least two CPRI links, and
wherein combining the multiple paths of I/Q data into a single I/Q data stream comprises combining the two paths of I/Q data with different content to obtain the single I/Q data stream.

7. The method according to claim 5, wherein the multiple paths of I/Q data include at least a first path of I/Q data and a second path of I/Q data, the first path of I/Q data having different content than the second path of I/Q data,
wherein receiving the multiple paths of I/Q data comprises receiving, by the RE, the first path of I/Q data over the first CPRI link between the RE and the first module, and receiving the second path of I/Q data over the second CPRI link between the RE and the second module, and
wherein combining the multiple paths of I/Q data into the single I/Q data stream comprises combining, by the RE, the first path of I/Q data with at least the second path of I/Q data to obtain the single I/Q data stream.

8. The method according to claim 5, wherein the multiple paths of I/Q data include at least a first path of I/Q data and a second path of I/Q data, the first path of I/Q data having different content than the second path of I/Q data,
wherein receiving the multiple paths of I/Q data comprises receiving, by the RE, the the first path of I/Q data from the first module of the REC over the first CPRI link, and receiving the second path of I/Q data from the second module of the REC over the second CPRI link, and
wherein combining the multiple paths of I/Q data into the single I/Q data stream comprises combining, by the RE, the first path of I/Q data with at least the second path of I/Q data to obtain the single I/Q data stream.

9. The method according to claim 5, wherein the multiple paths of I/Q data include at least a first path of I/Q data and a second path of I/Q data, the first path of I/Q data having different content than the second path of I/Q data,
wherein receiving the multiple paths of I/Q data comprises receiving, by the first module in the REC, the first path of I/Q data from the RE over the first CPRI link, and receiving the second path of I/Q data from the second module in the RE over the second data link, and
wherein combining the multiple paths of I/Q data into the single I/Q data stream comprises combining the first path of I/Q data with at least the second path of I/Q data to obtain the single I/Q data stream.

10. The method according to claim 5, wherein the multiple paths of I/Q data include at least a first path of I/Q data and a second path of I/Q data, the first path of I/Q data having different content than the second path of I/Q data,
wherein receiving the multiple paths of I/Q data comprises receiving, by the REC, the first path of I/Q data and the second path of I/Q data, and
wherein combining the multiple paths of I/Q data into the single I/Q data stream comprises combining the first path of I/Q data with at least the second path of I/Q data to obtain the single I/Q data stream.

11. The method of claim 5, wherein the first mode is a Global System for Mobile Communications (GSM) mode, and wherein the second mode is a Universal Mobile Telecommunications System (UMTS) mode.

12. A radio base station, comprising:
a Radio Equipment Control (REC) adapted to support multiple modes;
a Radio Equipment (RE); and
at least two Common Public Radio Interface (CPRI) links extending between the REC and the RE, the at least two CPRI links including a first CPRI link extending between the RE and a first module supporting a first mode in the REC, and a second CPRI link extending between the RE and a second module supporting a second mode in the REC, the second mode being different than the first mode, wherein a data link extends between the first module and the second module,
wherein in-phase/quadrature phase (I/Q) data communicated between the REC and the RE is transmitted over the at least two CPRI links, and
wherein the RE is configured to receive a single in-phase/quadrature phase (I/Q) data stream, to divide the single I/Q data stream into multiple paths of I/Q data, and to transmit the multiple paths of I/Q data to the REC over the at least two CPRI links, wherein the multiple paths of I/Q data include different paths of I/Q data having different content.

13. The radio control base station of claim 12, wherein the multiple paths of I/Q data include at least a first path of I/Q data and a second path of I/Q data, the first path of I/Q data having different content than the second path of I/Q data,
wherein the first module is configured to transmit the first path of I/Q data to the RE over the first CPRI link, and
wherein the second module is configured to transmit the second path of I/Q data to the RE over the second CPRI link.

14. The radio control base station of claim 12, wherein the first mode is a Global System for Mobile Communications (GSM) mode, and wherein the second mode is a Universal Mobile Telecommunications System (UMTS) mode.

15. The radio control base station of claim 12, wherein the multiple paths of I/Q data include at least a first path of I/Q data and a second path of I/Q data, the first path of I/Q data having different content than the second path of I/Q data,
wherein the RE transmits the first path of I/Q data over the first CPRI link to the first module in the REC, and
wherein the RE transmits the second path of I/Q data over the second CPRI link to the second module in the REC.

16. A radio base station, comprising:
a Radio Equipment Control (REC) adapted to support multiple modes;
a Radio Equipment (RE); and
at least two Common Public Radio Interface (CPRI) links extending between the REC and the RE, the at least two CPRI links including a first CPRI link extending between the RE and a first module supporting a first mode in the REC, and a second CPRI link extending between the RE and a second module supporting a second mode in the REC, the second mode being different than the first mode, wherein a data link extends between the first module and the second module,
wherein in-phase/quadrature phase (I/Q) data communicated between the REC and the RE is transmitted over the at least two CPRI links, and
wherein the RE is configured to:
receive multiple paths of in-phase/quadrature phase (I/Q) data over the at least two CPRI links, wherein the multiple paths of I/Q data include different paths of I/Q data having different content; and
combine the multiple paths of I/Q data into a single I/Q data stream.

17. The radio control base station of claim 16, wherein the multiple paths of I/Q data include at least a first path of I/Q data and a second path of I/Q data, the first path of I/Q data having different content than the second path of I/Q data,
wherein the RE receives the first path of I/Q data over the first CPRI link from the first module in the REC, and
wherein the RE receives the second path of I/Q data over the second CPRI link from the second module in the REC.

* * * * *